US012798184B2

(12) United States Patent
Somarakis et al.

(10) Patent No.: US 12,798,184 B2
(45) Date of Patent: Nov. 17, 2026

(54) DROP-ON-DEMAND PRINTER HAVING OPTIMIZED NOZZLE DESIGN

(71) Applicant: XEROX CORPORATION, Norwalk, CT (US)

(72) Inventors: Christoforos Somarakis, Gilroy, CA (US); Svyatoslav Korneev, San Jose, CA (US); Saigopal Nelaturi, Palo Alto, CA (US); Adrian Lew, Stanford, CA (US)

(73) Assignee: XEROX CORPORATION, Norwalk, CT (US)

( * ) Notice: Subject to any disclaimer, the term of this patent is extended or adjusted under 35 U.S.C. 154(b) by 175 days.

(21) Appl. No.: 17/185,840

(22) Filed: Feb. 25, 2021

(65) Prior Publication Data

US 2022/0266513 A1 Aug. 25, 2022

(51) Int. Cl.
*B29C 64/209* (2017.01)
*B22F 12/53* (2021.01)
*B33Y 30/00* (2015.01)

(52) U.S. Cl.
CPC ............ *B29C 64/209* (2017.08); *B22F 12/53* (2021.01); *B33Y 30/00* (2014.12); *B22F 2301/052* (2013.01)

(58) Field of Classification Search
None
See application file for complete search history.

(56) References Cited

U.S. PATENT DOCUMENTS 3,041,825 A 7/1962 Alford et al.
4,675,493 A 6/1987 Gartland et al.
4,882,595 A 11/1989 Trueba et al.
5,170,942 A 12/1992 Spink et al.
(Continued)

FOREIGN PATENT DOCUMENTS

CA 2519273 C 10/2004
JP 08025620 A * 1/1996
KR 100908115 B1 * 7/2009 .......... B41J 2/14137

OTHER PUBLICATIONS

JP-08025620-A English Machine Translation (Year: 1996).*
(Continued)

*Primary Examiner* — Keith Walker
*Assistant Examiner* — Catherine P Smith
(74) *Attorney, Agent, or Firm* — MH2 Technology Law Group LLP

(57) ABSTRACT

A drop-on-demand (DOD) printer is disclosed having an ejector which may include a nozzle, the nozzle including a tank in communication with a source of printing material, a constricted dissipative section in communication with the tank, which may include an elongated internal channel, and a shaping tip in communication with the constricted dissipative section which can include an exit orifice. The (DOD) printer also includes a power source configured to supply one or more pulses of power to the ejector, which causes one or more drops of the printing material to be jetted out of the nozzle. The DOD printer may include a constricted dissipative section configured to obstruct fluid flow that is cylindrical or axisymmetric and having a diameter less than
(Continued)

a diameter of the tank and less than a diameter of the shaping tip. The DOD printer may include a nozzle or an array of nozzles.

20 Claims, 19 Drawing Sheets

(56) References Cited

U.S. PATENT DOCUMENTS

| | | | | |
|---|---|---|---|---|
| 5,463,416 | A * | 10/1995 | Paton | B41J 2/195 347/100 |
| 5,573,682 | A | 11/1996 | Beason et al. | |
| 6,474,783 | B1 | 11/2002 | Pilossof et al. | |
| 8,622,715 | B1 | 1/2014 | Lott et al. | |
| 11,524,463 | B2 | 12/2022 | Korneev et al. | |
| 11,525,463 | B2 | 12/2022 | Sun et al. | |
| 11,571,740 | B2 | 2/2023 | Korneev et al. | |
| 2003/0170903 | A1 | 9/2003 | Johnson et al. | |
| 2004/0217186 | A1* | 11/2004 | Sachs | B33Y 30/00 239/11 |
| 2006/0203036 | A1 | 9/2006 | Sexton et al. | |
| 2007/0091150 | A1 | 4/2007 | Kodama | |
| 2007/0176022 | A1 | 8/2007 | Haiun | |
| 2010/0053270 | A1* | 3/2010 | Xu | B41J 2/1433 347/47 |
| 2010/0328402 | A1 | 12/2010 | Xie et al. | |
| 2011/0187798 | A1 | 8/2011 | Rogers et al. | |
| 2012/0105528 | A1 | 5/2012 | Alleyne et al. | |
| 2013/0273239 | A1* | 10/2013 | Harikrishna Mohan | B05B 1/3402 427/255.6 |
| 2015/0147421 | A1* | 5/2015 | Te | B29C 64/40 118/302 |
| 2017/0087632 | A1* | 3/2017 | Mark | B22D 27/003 |
| 2019/0061380 | A1 | 2/2019 | Luan et al. | |
| 2019/0176391 | A1* | 6/2019 | Rudolph | B29C 64/209 |
| 2020/0157718 | A1 | 5/2020 | D'Herin Bytner | |
| 2020/0164575 | A1 | 5/2020 | Yuwaki et al. | |
| 2020/0215750 | A1 | 7/2020 | Long et al. | |
| 2020/0290350 | A1* | 9/2020 | Budraa | B41J 2/145 |
| 2020/0369896 | A1* | 11/2020 | Steeman | C09D 11/101 |
| 2020/0376507 | A1* | 12/2020 | Ozdemir | B05B 7/1626 |
| 2021/0138794 | A1* | 5/2021 | Chen | B41J 2/1433 |
| 2021/0154916 | A1* | 5/2021 | Kazmer | B33Y 30/00 |
| 2021/0379664 | A1* | 12/2021 | Gibson | B33Y 40/00 |
| 2022/0032534 | A1* | 2/2022 | Michalowski | B22F 12/53 |
| 2022/0168817 | A1* | 6/2022 | Sambhy | B22F 10/322 |
| 2022/0266512 | A1 | 8/2022 | Somarakis et al. | |

OTHER PUBLICATIONS

Seongpil An; Effect of viscosity, electrical conductivity, and surface tension on direct-current-pulsed drop-on-demand electrohydrodynamic printing frequency. Appl. Phys. Lett. Nov. 24, 2014; 105 (21): 214102. (Year: 2014).*

KR-100908115-B1 English Machine Translation (Year: 2009).*

Castrejón-Pita, A.A., et al., "Breakup of Liquid Filaments," Physical Review Letters, vol. 108, No. 7, 2012 (Week ending Feb. 17, 2012), pp. 074506-1-074506-5.

Tamayol, A., et al., "Laminar Flow in Microchannels With Noncircular Cross Section," Journal of Fluids Engineering, vol. 132, Nov. 2010, pp. 111201-1-111201-9.

Van Rijn, C.J.M., et al., "Droplet Formation by Confined Liquid Threads inside Microchannels," Langmuir, vol. 33, 2017 (Published Sep. 4, 2017), pp. 10035-10040.

Yuan, R., et al., "Microfluidics in structured multimaterial fibers," PNAS, vol. 115, No. 46, 2018 (Published online Oct. 29, 2018), pp. E10830-E10838.

Hoath, S.D., et al., "Drop Speeds from Drop-on-Demand Ink-Jet Print Heads," Journal of Imaging Science and Technology, vol. 57, No. 1, Jan.-Feb. 2013 (Published online Apr. 23, 2013), pp. 010503. 1-010503.11.

Li, L., et al., "Development of a multi-nozzle drop-on-demand system for multi-material dispensing," Journal of Materials Processing Technology, vol. 209, 2009 (Published May 1, 2009), pp. 4444-4448.

Simonelli, M., et al., "Towards digital metal additive manufacturing via high-temperature drop-on-demand jetting," Additive Manufacturing, vol. 30, 100930, 2019 (Available online Oct. 31, 2019), pp. 1-9.

Somarakis, C., et al., "Optimized Nozzle Design for Drop-On-Demand Printers and Methods Thereof," U.S. Appl. No. 17/185,826, filed Feb. 25, 2021, 62 pages.

Stachewicz et al., "Relaxation Times in Single Event Electrospraying Controlled by Nozzle Front Surface Modification," Langmuir (2009), 25, 2540-2549.

Kungurtsev, P.V., "Adjoint-based optimization for inkjet printing," Ph.D. Dissertation, Department of Engineering, University of Cambridge, St. Edmund's College, Dec. 2020, 184 pages.

Kungurtsev, P.V., et al., "Adjoint-based shape optimization of the microchannels in an inkjet printhead," J. Fluid Mech., vol. 871, 2019 (First Published Online May 17, 2019), pp. 113-138.

Bierbrauer, F., et al., "Drop Pinch-Off for Discrete Flows from a Capillary," ESAIM: Proceedings, vol. 40, Jul. 2013, pp. 16-33.

* cited by examiner

DROP-ON-DEMAND PRINTER HAVING OPTIMIZED NOZZLE DESIGN

TECHNICAL FIELD

The presently disclosed embodiments or implementations are directed to energy dissipative nozzles for drop-on-demand printing systems and method for the same.

BACKGROUND

Drop-On-Demand (DOD) printing systems, such as ink-jet or liquid metal-jet, attain significant advantages over alternative technologies, two of which are the lack of additional post-printing processing steps and relative affordability. Unfortunately, DOD basic performance metrics (e.g. printing speed, accuracy) are on average lower than other technologies and sensitive to product geometry. Products with complex geometries manufactured with liquid metal DOD technologies may require hundreds of thousands or millions of droplets and may take appreciably longer times to be built. Printed parts may also deviate from as-planned computer aided designs (CAD), due to accumulating error from the nominal geometry per deposited droplet. Furthermore, speed and accuracy are correlated with a fundamental trade-off: Printing speed comes at the cost of accuracy. Therefore, droplet speed, shape and volume play a significant role in printing quality metrics.

In a DOD ejection system, the focus of this fundamental tradeoff is within the ejector nozzle, a device designed to control fluid flow and eject droplets with consistent characteristics such as shape, volume, and speed to meet a required throughput characterized by mass ejected per unit of time. The application for which the nozzle is designed drives the desired droplet characteristics; for example in 3D printing systems large/bulky droplets may be undesirable because of the agility required to print complex geometric objects, whereas in liquid dosage applications larger droplets may be desirable. Throughput requirements are set to make the droplet ejection system economically attractive for the application.

Both theoretical and experimental evidence suggests that printing irregularities may arise due to unpredictable speed, shape, and volume of the droplets generated by the nozzle, in lieu of the constant nominal values expected by design. These irregularities have been traced to both the dynamics of the liquid in the tank feeding the nozzle and the time it takes for the liquid inside the nozzle to become quiescent, since both alter the initial condition and pressure signal under which each new droplet is generated.

Requirements on the throughput and droplet characteristics in turn imply a requirement on the frequency at which the nozzle must eject consistent droplets. Experimental evidence indicates the firing frequency for stable drop-to-drop behavior is affected by the time it takes for the meniscus (the boundary between fluid and atmosphere at the nozzle orifice) to settle after droplet ejection, i.e. a drop should ideally be ejected when the meniscus is quiescent. Droplets fired after the meniscus is quiescent show consistent characteristics, whereas ejecting droplets at frequencies faster than the reciprocal of the settling time can result in significant drop-to-drop variation. Thus the nozzle must be designed such that the settling time of the meniscus after droplet ejection, also referred to as the relaxation time, is small enough to permit a desired firing frequency.

A nozzle having a design capable of simultaneously controlling the relaxation time and droplet characteristics is desirable, particularly one wherein the problem of controlling the relaxation time may be decoupled from the problem of shaping the droplet. What is needed are nozzle designs concurrently addressing the foregoing criteria while allowing for adaptation of printing media and application and methods for designing the same.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A drop-on-demand (DOD) printer is disclosed having an ejector which may include a nozzle, the nozzle including a tank in communication with a source of printing material, a constricted dissipative section in communication with the tank, which may include an elongated internal channel, and a shaping tip in communication with the constricted dissipative section which can include an exit orifice. The drop-on-demand (DOD) printer also includes a power source configured to supply one or more pulses of power to the ejector, which causes one or more drops of the printing material to be jetted out of the nozzle.

Embodiments may include one or more of the following features. The DOD printer may include a constricted dissipative section of the nozzle configured to obstruct fluid flow. The elongated internal channel may be cylindrical or axisymmetric having a diameter less than a diameter of the tank. The constricted dissipative section of the nozzle may be axisymmetric and also have a diameter less than a diameter of the shaping tip. The constricted dissipative section of the nozzle may include at least three internal cylindrical channels with substantially the same diameter. Certain embodiments of the constricted dissipative section may include at least two intersecting channels that are substantially perpendicular to one another. The constricted dissipative section of the nozzle may further include a porous media or tapered transition between the constricted dissipative section and the shaping tip. The exit orifice of the shaping tip of the nozzle may be cylindrical where a radius of curvature of the exit orifice may be less than 10 percent of a diameter of the exit orifice. Embodiments of the nozzle may be configured to eject a droplet by operating a droplet generation event followed by a droplet ejection event. The printing material for use in nozzle embodiments may include a polymer, polymer composite, or a combination thereof. The printing material for use in nozzle embodiments may include metal, metallic alloys, or a combination thereof. The printing material may include aluminum, aluminum alloys, or a combination thereof.

Another embodiment of a drop-on-demand (DOD) printer is disclosed having an ejector which may include a nozzle, the nozzle including a tank in communication with a source of printing material, a constricted dissipative section in communication with the tank and configured to obstruct fluid flow, the dissipative section including in certain embodiments an elongated internal channel, and a shaping tip in communication with the constricted dissipative section may include an exit orifice. The DOD printer may also include a power source configured to supply one or more pulses of power to the ejector, which causes one or more drops of the printing material to be jetted out of the nozzle, and where the nozzle is configured to eject a droplet by operating a generation event followed by an ejection event. Certain embodiments may include a nozzle where the dissipative section may include an axisymmetric portion having a diameter less than a diameter of the tank, and a diameter less than a diameter of the shaping tip. The dissipative section of the nozzle may include at least three internal cylindrical channels and having substantially the same diameter.

Another embodiment of a drop-on-demand (DOD) printer is disclosed having an ejector which may include an array of nozzles, the array of nozzles including a plurality of nozzles, each nozzle having a tank in communication with a source of printing material, a constricted dissipative section in communication with the tank and configured to obstruct fluid flow, which may include an elongated internal channel, and a shaping tip in communication with the constricted dissipative section that includes an exit orifice. The DOD printer may further include a power source configured to supply one or more pulses of power to the ejector, which causes one or more drops of the printing material to be jetted out of the nozzle. The DOD printer may include one or more nozzles configured to eject a droplet by operating a generation event followed by an ejection event.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

Figure 1:
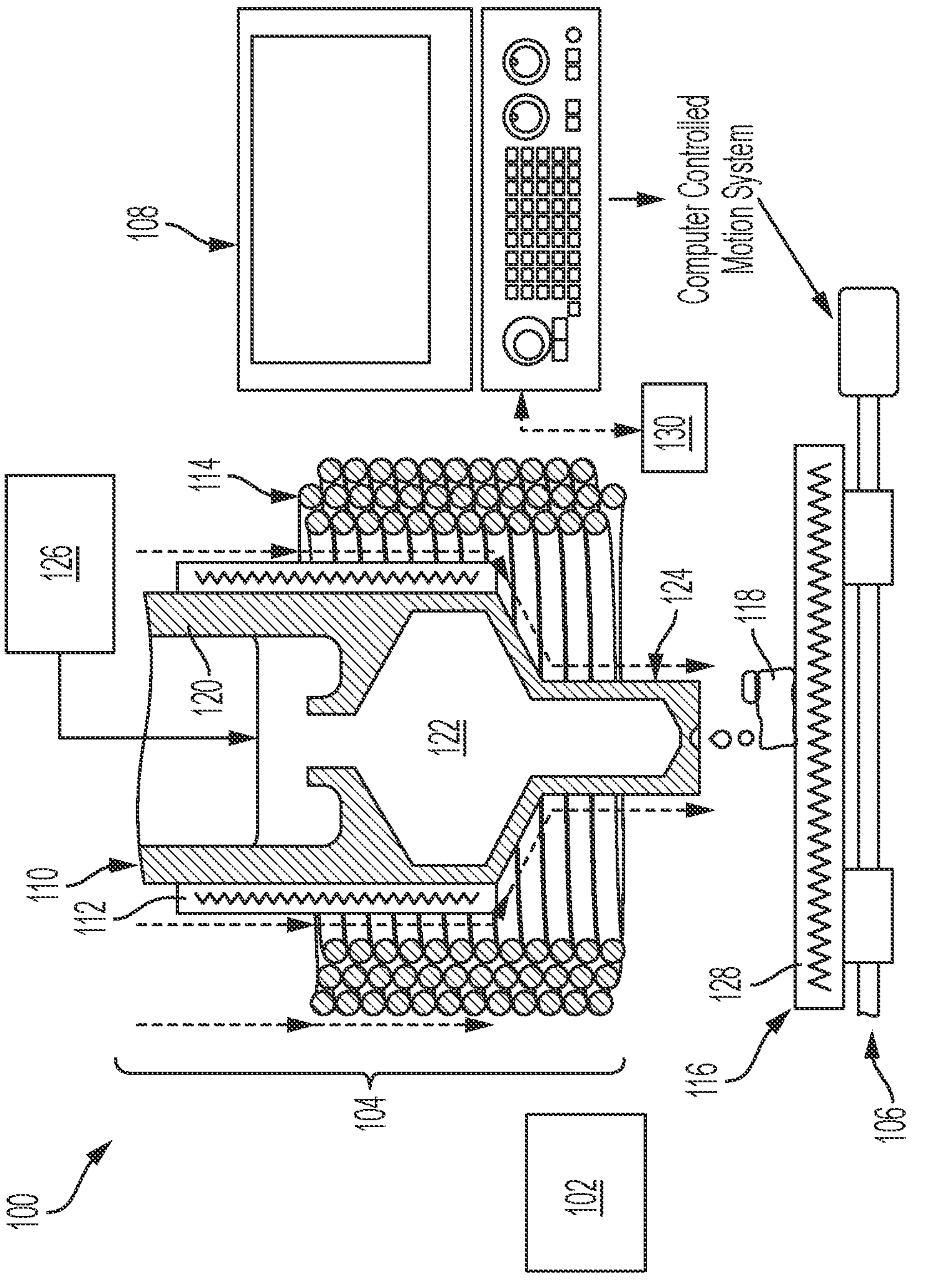
FIG. 1 illustrates a schematic cross-sectional view of an exemplary additive manufacturing layering device or 3D printer incorporating a nozzle design, according to one or more embodiments disclosed.

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/BB/C, AB/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure is directed to additive manufacturing devices or 3D printers and methods for the same. Particularly, the present disclosure is directed to targeted heating systems for the 3D printers and methods for the same. Forming structures with molten metal droplets is a complex thermo-fluidic process that involves re-melting, coalescence, cooling, and solidification. Voids and cold lap (lack of fusion) are caused by poor re-melting and insufficient metallurgical bonding under inappropriate temperatures at the interface formed between the molten metal droplets and previously deposited material or substrates (e.g., droplets). The interfacial temperature is determined primarily by the droplet temperature and the surface temperature of the previously deposited material or substrate. Obtaining and retaining accurate part shape and z-height are also negatively impacted by the same factors. An interfacial temperature that is too low results in the formation of voids and cold laps from insufficient re-melting and coalescence. For an interfacial temperature that is too high, the new droplets flow away from the surface of previously deposited material before solidification, which leads to the malformation of part shape and z-height error. The interfacial temperature can be affected by the initial droplet temperature, the build part surface temperature, the build plate temperature, drop frequency, and part z-height. It can be controlled at some level through process parameter optimization, but the thermal processes involved may be too slow to keep up with the changes and dynamics that occur during part printing that can result in unacceptable interfacial temperatures. As further described herein, the targeted heating systems may be capable of or configured to modify interfacial temperatures and/or temperature gradients of a substrate and/or an area proximal the substrate to control grain size, growth, and/or structure of the metal forming an article prepared by the 3D printer to address the aforementioned issues. For example, the targeted heating system may be capable of or configured to modify interfacial temperatures and/or temperature gradients of a melt pool to control grain size, growth, and/or structure of the metal forming the article, thereby improving build strength, adhesion, porosity, and/or surface finish, and preventing cracks and fractures in the article.

FIG. 1 illustrates a schematic cross-sectional view of an exemplary drop-on-demand (DOD) printing device or 3D printer 100 incorporating a targeted heating system 102, according to one or more embodiments. The 3D printer 100 may be a liquid metal jet printing system, such as a magnetohydrodynamic (MHD) printer. It should be appreciated, however, that any drop-on-demand (DOD) printing device may utilize the components and methods disclosed herein. The 3D printer 100 may include a printhead 104, a stage 106, a computing system 108, the targeted heating system 102, or any combination thereof. The computing system 108 may be operably and/or communicably coupled with any one or more of the components of the 3D printer 100. The computing system 108 may be capable of or configured to operate, modulate, instruct, receive data from, or the like from any one or more of the components of the 3D printer 100. The printhead 104 may include a body 110, which may also be referred to herein as a pump chamber, one or more heating elements (one is shown 112), one or more metallic coils 114, or any combination thereof, operably coupled with one another. As illustrated in FIG. 1, the heating elements 112 may be at least partially disposed about the body 110, and the metallic coils 114 may be at least partially disposed about the body 110 and/or the heating elements 112. As used herein, a substrate 116 may refer to a surface of the stage 106, a previously deposited printing material or metal (e.g., metal droplets), an article 118 fabricated from the 3D printer 100 or a portion thereof, a platen 128, such as a heated platen or build plate disposed on the stage 106, and/or respective surfaces thereof. As illustrated in FIG. 1, the substrate 116 may be disposed on or above the stage 106 and below the body 110. The body 110 may have an inner surface 120 defining an inner volume 122 thereof. The body 110 may define a nozzle 124 disposed at a first end portion of the body 110. The body 110 of the printhead 104 may also define more than one nozzle 124 which may operate in conjunction with one another, or alternatively be independently operable from one another.

In an exemplary operation of the 3D printer 100 with continued reference to FIG. 1, a build material (e.g., metal) from a source 126 may be directed to the inner volume 122 of the body 110. The heating elements 112 may at least partially melt the build material contained in the inner volume 122 of the body 110. For example, the build material may be a solid, such as a solid metal, and the heating elements 112 may heat the body 110 and thereby heat the build material from a solid to a liquid (e.g., molten metal). The metallic coils 114 may be coupled with a power source (not shown) capable of or configured to facilitate the deposition of the build material on the substrate 116. For example, the metallic coils 114 and the power source coupled therewith may be capable of or configured to generate a magnetic field, which may generate an electromotive force within the body 110, thereby generating an induced electrical current in the molten metal disposed in the body 110. The magnetic field and the induced electrical current in the molten metal may create a radially inward force on the liquid metal, known as a Lorentz force, which creates a pressure at the nozzle 124. The pressure at the nozzle 124 may expel the molten metal out of the nozzle 124 toward the substrate 116 and/or the stage 106 in the form of one or more drops to thereby form at least a portion of the article 118.

In at least one embodiment, the build material may be or include one or more metals and/or alloys thereof. Illustrative build materials may be or include, but are not limited to, aluminum, aluminum alloys, brass, bronze, chromium, cobalt-chrome alloys, copper, copper alloys, iron alloys (Invar), nickel, nickel alloys (Inconel), nickel-titanium alloys (Nitinol), stainless steel, tin, titanium, titanium alloys, gold, silver, molybdenum, tungsten, or the like, or alloys thereof, or any combination thereof. It should be appreciated that the droplet and substrate temperatures will be different for different metals.

In another embodiment, the build material may be or include one or more polymeric materials or polymers, or composites thereof. The polymers may be or include functional polymers. Illustrative functional polymers may include, but are not limited to, heat resistant polymers, conductive polymers, piezoelectric polymers, photosensitive polymers, or any combination thereof. The polymers may also be or include, but are not limited to, polyolefin-based polymers, acryl-based polymers, polyurethane-based polymers, ether-based polymers, polyester-based polymers, polyamide-based polymers, formaldehyde-based polymers, silicon-based polymers, or any combination thereof. For example, the polymers may include, but are not limited to, poly(ether ether ketone) (PEEK), TORLON®, polyamide-imides, polyethylene (PE), polyvinyl fluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide, polyimide, any copolymers thereof, or any combination thereof. In at least one embodiment, the polymer may be or include an elastomer, synthetic rubber, or any combination thereof. Illustrative elastomeric materials and synthetic rubbers may include, but are not limited to, VITON®, nitrile, polybutadiene, acrylonitrile, polyisoprene, neoprene, butyl rubber, chloroprene, polysiloxane, styrene-butadiene rubber, hydrin rubber, silicone rubber, ethylene-propylene-diene terpolymers, any copolymers thereof, or any combination thereof.

In an exemplary embodiment, the polymer includes acrylonitrile butadiene styrene (ABS), polycarbonate (PC), polylactic acid (PLA), high density polyethylene (HDPE), polyphenylsulfone (PPSU), poly(meth)acrylate, polyetherimide (PEI), polyether ether ketone (PEEK), high impact polystyrene (HIPS), thermoplastic polyurethane (TPU), polyamides (nylon), composites thereof, or combinations thereof.

In at least one embodiment, the 3D printer 100 may include a monitoring system 130 capable of or configured to control and/or monitor one or more components or portions of the 3D printer 100, the formation of the article 118, one or more portions of the substrate 116, one or more areas proximal the substrate 116, and/or the deposition of the droplets. For example, the monitoring system 130 may include one or more illuminators (not shown) capable of or configured to measure droplet, build part, build plate, and substrate temperatures, measure build part shape and z-height, measure droplet size and rate, or the like, or any combination thereof. Illustrative illuminators may be or include, but are not limited to, lasers, LEDs, lamps of various types, fiber optic light sources, or the like, or combinations thereof. In another example, the monitoring system 130 may include one or more sensors (not shown) capable of or configured to measure a temperature of one or more components or portions of the 3D printer 100. Illustrative sensors may be or include, but are not limited to, pyrometer, thermistors, imaging cameras, photodiodes, or the like, or combinations thereof. The monitoring system 130 may also be capable of or configured to provide feedback or communicate with the computing system 108.

In at least one embodiment, any one or more components of the 3D printer 100 may move independently with respect to one another. For example, any one or more of the printhead 104, the stage 106 and the platen 128 coupled therewith, the targeted heating system 102, the monitoring system 130, or any combination thereof may move independently in the x-axis, the y-axis, and/or the z-axis, with respect to any one or more of the other components of the 3D printer 100. In another embodiment, any two or more of the components of the 3D printer 100 may be coupled with one another; and thus, may move with one another. For example, the printhead 104 and the targeted heating system 102 may be coupled with one another via a mount (not shown) such that the movement or translation of the printhead 104 in the x-axis, the y-axis, and/or the z-axis results in a corresponding movement of the targeted heating system 102 in the x-axis, the y-axis, and/or the z-axis, respectively. Similarly, the targeted heating system 102 and the stage 106 may be coupled with one another via a mount (not shown) such that the movement of the targeted heating system 102 in the x-axis, the y-axis, and/or the z-axis results in a corresponding movement of the stage 106 in the x-axis, the y-axis, and/or the z-axis, respectively.

In certain embodiments, various build materials may influence particular design considerations based on the printing material properties and composition, particularly at jetting temperature. Molten metal and/or molten polymer-based printing materials may have differing viscosity, surface tension, and other properties at jetting temperature that impact and influence nozzle design and other printing system parameters such as magnetic field settings, electrical current settings, as well as other parameters that influence the forces applied to the molten or liquid printing material to create pressure at the nozzle 124. Likewise, aqueous-based materials may require still other design considerations to create pressures at the nozzle 124 suitable for printing in various drop-on-demand printing and drop ejection configurations.

Nozzle Design for Pulsed Droplet Ejection Systems

In certain embodiments of a DOD ejection system, or DOD printer, the nozzle is designed to control fluid flow and eject droplets with consistent characteristics (shape/volume/speed) to meet a required throughput (mass ejected per unit of time). The application for which the nozzle is designed drives the desired droplet characteristics; for example in 3D printing systems large/bulky droplets may be undesirable because of the agility required to print complex geometric objects, whereas in liquid dosage applications larger droplets are more suitable. Throughput requirements are set to make the droplet ejection system economically attractive for the application.

It is known to those skilled in the art that printing irregularities may arise due to unpredictable speed, shape, and volume of the droplets generated by the nozzle, in lieu of the constant nominal values expected by design. These irregularities may be attributable to the forces required within a nozzle to eject a printing material in terms of both the dynamics of the liquid in the tank feeding the nozzle and the time it takes for the liquid inside the nozzle to become quiescent, since both attributes alter the initial condition and pressure signal under which each new droplet is generated.

In certain embodiments, the system inputs related to throughput and droplet characteristics may ultimately dictate the available frequency at which the nozzle must eject consistent droplets. The firing frequency necessary for stable drop-to-drop behavior may be further influenced by the time it takes for the meniscus, or the boundary between fluid and atmosphere at the nozzle orifice, to settle after droplet ejection, thus dictating that a drop should ideally be ejected when the meniscus is quiescent. Droplets fired after the meniscus is quiescent show more consistent characteristics, whereas ejecting droplets at frequencies faster than the reciprocal of the settling time can result in significant drop-to-drop variation. Thus, the nozzle must be designed such that the settling time of the meniscus after droplet ejection, henceforth labeled the relaxation time, is small enough to permit a desired firing frequency. A method for designing a nozzle to simultaneously control the relaxation time and droplet characteristics upon ejection is advantageous in certain embodiments. An optimized nozzle may be designed by decoupling the problem of controlling the relaxation time from the problem of shaping the droplet in an ejector nozzle.

Figure 2A:
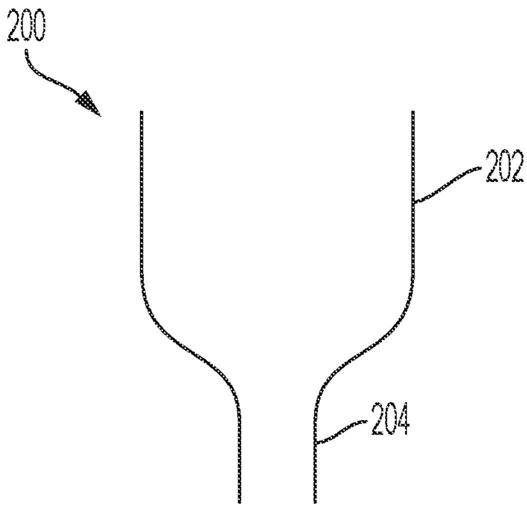
FIG. 2A illustrates a schematic cross-sectional view of a prior art conventional nozzle design.
Figure 2B:
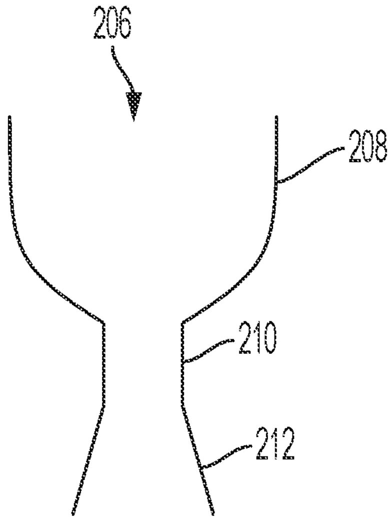
FIG. 2B illustrates a schematic cross-sectional view of an exemplary nozzle design, according to one or more embodiments disclosed.

FIG. 2A illustrates a schematic cross-sectional view of a prior art conventional nozzle design. The general structure of the nozzle 200 includes a tank 202 and a tip 204. FIG. 2B illustrates a schematic cross-sectional view of an exemplary nozzle design, according to one or more embodiments disclosed. In an exemplary embodiment the nozzle 206 consists of three contiguous sections—the upper tank section 208, where the liquid material is stored, a dissipative section 210, designed to enable a desired maximum frequency with which droplets can be ejected, and a shaping section 212, also referred to as a shaping tip, capable of ejecting droplets with consistent characteristics regarding shape and size. Certain embodiments of printers as described herein may have a collection of one or more such nozzles 206 arranged and configured to eject droplets simultaneously, such that the ejected droplets may combine to form a single droplet. In embodiments described herein, a method for designing a dissipative section 210 capable of dissipating energy based on obstructing the fluid flow through the dissipative section may be employed, by determining a combination of shaping the nozzle geometry with constricted passages to the fluid flow, introducing a porous obstacle to the fluid flow, or combinations thereof. In embodiments described herein, the dissipative section may be an axisymmetric portion of the nozzle between the tank and the shaping tip or shaping section.

In the embodiment shown in FIG. 2B, an exemplary nozzle has a tank in communication with a dissipative section, and a shaping section in communication with the dissipative section, which is also in communication with a shaping section. The function of the dissipative section of the nozzle is to dissipate fluid energy and increases the momentum loss, which in turn increases a meniscus damping rate and hence decreases the relaxation time. The relaxation time, $\tau$, is defined as the time it takes for a deformation of a meniscus of liquid printing material at a front plane face of a nozzle to return to a quiescent state after a drop of printing material is jetted. The relaxation time, t, is the time required for an exponentially decreasing variable, in this case, the amplitude of a damped oscillation, to decrease from an initial value to 1/e or 0.368 of that initial value (where e is the base of natural logarithms). This value can be considered a consistent index for measuring the time it takes for a meniscus at a nozzle face to return to a static equilibrium. The shaping section is designed to generate teardrop shaped droplets with a prescribed volume and center of mass velocity, as compared to elongated droplets which are simpler to generate. The cooperative design of the two sections permits concurrent controlling of the speed of the center of mass of each droplet and the number of droplets formed per pulse. A pulse may be understood to be pressure signal on the upper end of the nozzle intended to eject one or more droplets from the nozzle.

Design of the Dissipative Section

In certain embodiments, dissipative sections with constant cross section may be considered for purposes of establishing design parameters, although constant cross-sections are not required. The relaxation time $\tau$ is proportional to a constant cross-sectional area of the dissipative section. Therefore, $\tau$ can be set by appropriately choosing geometric parameters that define the cross-sectional area in the dissipative section. The relaxation time is largely independent of the length of the dissipative section and as such the dissipative section should be long enough to be manufacturable and rigid. When the nozzle is operating in a steady state, the amount of fluid travelling through the dissipative section to reach the shaping section should at least be equal to the mass of the ejected droplet. In certain embodiments, some additional fluid could flow as well, and later flow back into a pump or reservoir in communication with the tank portion of the nozzle. In certain embodiments, the parameters selected for the dissipative section design are chosen to control the relaxation time of the meniscus at the exit orifice of a nozzle.

In certain embodiments, it is desirable to eject a single droplet that does not split into satellite droplets. To avoid this, the velocities inside the droplet should not be too different from that of the droplet's center of mass. The kinetic energy that the droplet carries with it is roughly proportional to the mass of the droplet times the velocity of the center of mass squared. If the fluid travels through the dissipative section faster than the expected velocity of the droplet, the excess kinetic energy it carries with it should be dissipated after the droplet is ejected. The larger the fluid speed through the dissipative section, the more energy that needs to be dissipated, the larger the energy cost of operating the nozzle, and the longer the time it takes to have oscillations of the meniscus decay to an acceptable level, and hence the lower the operating frequency. Therefore, the speed of the fluid through the dissipative section should not be much larger than the desired speed of the center of mass of the ejected droplet. Additionally, in steady operation, the fluid already in the shaping section would have speeds near zero at the beginning of each pulse, and it should be accelerated to the desired speed of the droplet to be ejected. If the speed of the fluid through the dissipative section is too large, the increase in pressure and the viscous forces in the shaping section are not enough to accelerate the fluid therein, which may result in multiple droplets being ejected, or in a droplet that breaks apart soon after being ejected, or simply in a very elongated droplet of a small diameter. At the same time, the fluid that travels through the shaping section should have a large enough speed and hence kinetic energy to inflate the meniscus, so the speed of the fluid through the dissipative section has to necessarily be larger than the desired speed of the center of mass of the droplet. Given the qualitative relationship between the fluid velocity in the dissipative section, the meniscus settling time, and the droplet speed, we use a classical idea in fluid dynamics to design the dissipative section, i.e., obstructing the flow of a fluid can be used to control pressure drops and velocity changes. In embodiments described herein, obstructions may be realized by choking or constricting the fluid motion as seen in Venturi nozzles, and/or alternatively by the incorporation of permeable media within in the dissipative section.

Figure 3:
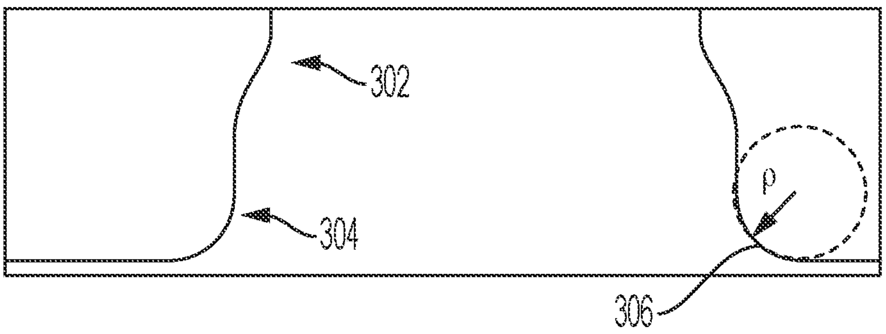
FIG. 3 illustrates a schematic cross-sectional view of a portion of a nozzle design, according to one or more embodiments disclosed.

FIG. 3 illustrates a schematic cross-sectional view of a portion of a nozzle design, according to one or more embodiments disclosed. An exit portion of the dissipative section 302 is shown leading to an exit orifice 304 of the shaping section, the exit orifice having a radius of curvature, $\rho$, 306 that influences nozzle design. In certain embodiments the length and dimensions of a transition zone between the dissipative section and the shaping section also influences the dissipation of energy within a fluidic printing material moving through a nozzle. In certain embodiments the dissipative section 302 cross-sectional area is smaller the cross-sectional area of the exit orifice 304. The radius of curvature, ρ, 306 at the exit orifice 304 defines the dynamics of the meniscus, which will be described in further detail later.

Figure 4A:
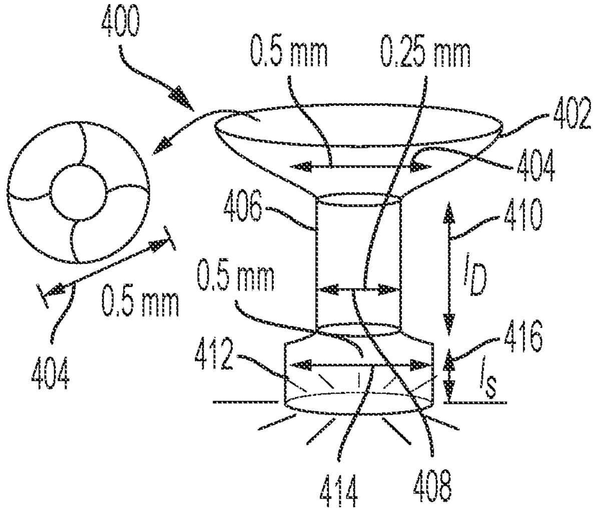
FIGS. 4A-4D illustrate several multi-sectional nozzles, according to one or more embodiments disclosed.

FIGS. 4A-4D illustrate several multi-sectional nozzles, according to one or more embodiments disclosed. FIG. 4A shows an axisymmetric nozzle embodiment having a constricted channel dissipative section. The dissipative section is designed as a constriction as compared to the diameter of the tank and the diameter of the shaping section. Given the requirement that the jetted fluid printing material needs to slow down after exiting the dissipative section, conservation of mass indicates that the dissipative section must open out to increase the cross-sectional area in the shaping section. As a pressure pulse is applied to the printing material at the top of the tank, the liquid in the dissipation section attains a very large momentum as compared to the velocity target. Consequently, the liquid in the shaping section is subjected to pressure. If the speed is too high and the cross-sectional area between the dissipative section and shaping section is small, the droplet ejected from the nozzle has very large dispersion in its initial velocity field. Particles in such a droplet therefore may move with different velocities too high and too low as compared to targeted values. Droplets behaving in this manner are susceptible to having unacceptable shape may likely break up before reaching the substrate. To counteract these undesirable effects and maximize droplet uniformity, the liquid in the shaping section that is to be ejected must be equally accelerated from the pushing coming from dissipative section. One way to accomplish this is to increase the cross-sectional area, i.e., the area that connects the two sections. An additional advantage of increasing this cross-sectional area is that the undesirable high speeds generated in the dissipation section may be slowed down. While constricted nozzles are known to those skilled in the art, the utilization of a constrictive dissipation section in combination with a corresponding shaping section in DOD printing applications to control the meniscus oscillation and droplet characteristics as described herein provides advantages. FIG. 4A illustrates an axisymmetric constricted nozzle 400 having a tank 402 having a given diameter 404 as indicated. The tank 402 is a reservoir or receptacle for liquid or molten printing material, which is not included in this view. The tank 402 is in fluid communication with a dissipative section 406, which in this embodiment is shown as a cylinder. This cylindrical dissipative section 406 defines a diameter 408 which is indicated as being a smaller diameter 408 than the indicated diameter 404 of the tank 402. The cylindrical dissipative section 406 further defines a length, $l_D$ 410. Printing material is fed from the tank 402 to the cylindrical dissipative section 406 via gravity, positive pressure, or other means known to those skilled in the art. The cylindrical dissipative section 406 is in fluid communication with a shaping section 412. The shaping section 412 also defines a diameter 414 which is indicated as being a larger diameter 414 as compared to the diameter 408 of the cylindrical dissipative section 406. The shaping section 412 further defines a length, $l_S$ 416. This provides a nozzle 400 having a geometrically constricted dissipative section 406 as compared to the tank 402 and the shaping section 412. It is understood that the meniscus of a printing material being jetted by such a nozzle settles faster in a constricted nozzle as compared to an unconstricted one.

Figure 4B:
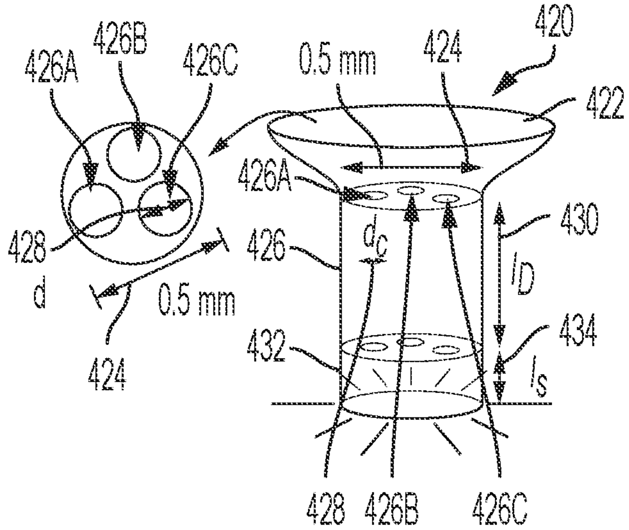

FIG. 4B shows a nozzle embodiment having a "shower-head" channel dissipative section. This may also be referred to as a dissipative channel having at least two multiple internal channels. The exemplary embodiment of the shower-head channel nozzle 420 defines a tank 422 having a given diameter 424 as indicated. The tank 422 is a reservoir or receptacle for liquid or molten printing material, which is not included in this view. The tank 422 is in fluid communication with a dissipative section 426, which in this embodiment is overall shown as a cylinder. The dissipative section 426 includes three individual internal elongated cylindrical channels. While three internal channels 426A, 426B, 426C are illustrated in this embodiment, alternate embodiments may include as few as two internal channels, as many as ten internal channels, or possibly more as determined by the requirements of the nozzle design dictated by the dimensions and balances between system parameters. Each internal cylindrical channel 426A, 426B, 426C has a channel diameter $d_C$ 428 which is indicated as being a smaller diameter 428 than the indicated diameter 424 of the tank 422, as well as smaller than the overall diameter of the entire dissipative section 428 (which is not indicated here). While the three internal channels 426A, 426B, 426C illustrated in this embodiment are shown to have the same diameter, alternate embodiments of nozzles may have differing diameters depending on system requirements. The dissipative section 426 further defines a length, $l_D$ 430. Printing material is fed from the tank 422 to the dissipative section 426 via gravity, positive pressure, or other means known to those skilled in the art. The dissipative section 426 and in particular the three internal channels 426A, 426B, 426C are in fluid communication with a shaping section 432. It should be noted that the three internal channels are not in direct communication with one another, but they are each in communication with the tank 422 and with the shaping section 432 of the nozzle 420 of FIG. 4B. The shaping section 432 also defines a diameter 434 which is indicated as being a similar diameter 434 as compared to the overall diameter of the dissipative section 426 yet larger than the channel diameter $d_C$ 428 of each of the three internal channels 426A, 426B, 426C, whether taken individually or combined, of the dissipative section 426. The shaping section 432 further defines a length, $l_S$ 434. This provides a nozzle 420 having a geometrically constricted dissipative section 426 as compared to the tank 422 and the shaping section 432, regardless of the overall diameter of the nozzle 420 itself. Such obstructions to the fluid flow as a dissipative section with narrow channels having a cumulative cross-sectional area comparable to other nozzle embodiments described herein, distribute the dissipative section, providing a more uniform push of the fluid already in the shaping section and therefore of the meniscus. This may facilitate the ejection of single droplets from a nozzle with a larger flexibility in terms of choosing pressure signals. As all channels in the nozzle 420 have a circular cross-section, the relaxation time scales with the sum of the areas of the internal channels 426A, 426B, 426C.

Figure 4C:
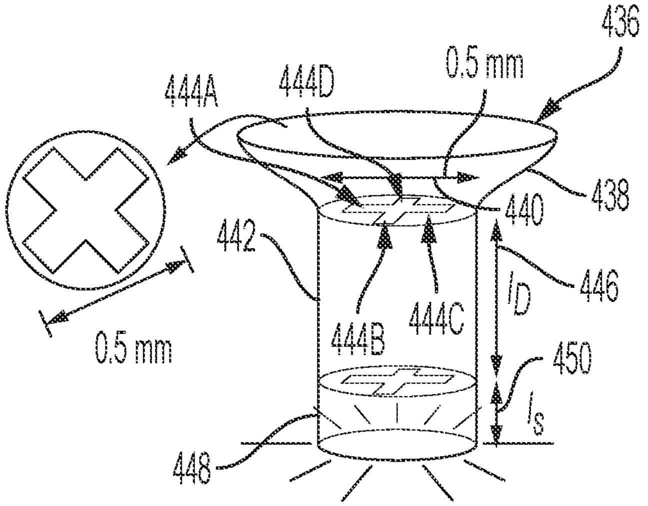

FIG. 4C shows a nozzle embodiment having a "cross-channel" dissipative section. This may also be referred to as a dissipative channel having multiple axisymmetric parallel plate channels. This embodiment of the cross-channel nozzle 436 defines a tank 438 having a given diameter 440 as indicated. The tank 438 is a reservoir or receptacle for liquid or molten printing material, which is not included in this view. The tank 438 is in fluid communication with a dissipative section 442, which in this embodiment is overall shown as a cylinder. The dissipative section 442 includes a first set of parallel plates 444A, a second set of parallel plates 444B, a third set of parallel plates 444C, and a fourth set of parallel plates 444D. Each of the four sets of parallel plates 444A, 444B, 444C, 444D are interconnected along a length of the dissipative section 442, thus forming four interconnected channels. This "cross-channel" constricted dissipative section has two intersecting channels that are substantially perpendicular to one another and the two intersecting channels have two walls that are parallel to one another. Alternate embodiments may have three, or more intersecting channels are arranged at substantially 45-degree angles around an axis of the constricted dissipative section. While four sets of parallel plates 444A, 444B, 444C, 444D evenly spaced around a center axis of the dissipative section 442 at approximately 90 degrees from one another are illustrated in this embodiment, alternate embodiments may include as few as two internal channels, as many as ten internal channels, or possibly more as determined by the requirements of the nozzle design dictated by the dimensions and balances between system parameters. Furthermore, alternate embodiments may be spaced about a center axis from about 10 degrees from one another to about 345 degrees from one another and need not be evenly spaced. Each internal channel defined by the four sets of parallel plates 444A, 444B, 444C, 444D has a channel distance between each of a set of parallel plates, not indicated here, which is a smaller distance than the indicated diameter 440 of the tank 438, as well as smaller than the overall diameter of the entire dissipative section 442 (which is not indicated here). While the four sets of parallel plates 444A, 444B, 444C, 444D illustrated in this embodiment are shown to have the same distance between each of the parallel plates forming the set, alternate embodiments of nozzles may have differing distances between each set of plates depending on system requirements. The dissipative section 442 further defines a length, lD 446. Printing material is fed from the tank 438 to the dissipative section 442 via gravity, positive pressure, or other means known to those skilled in the art. The dissipative section 442 and in particular the four sets of parallel plates 444A, 444B, 444C, 444D are in fluid communication with a shaping section 448. It should be noted that the four sets of parallel plates 444A, 444B, 444C, 444D are also in direct communication with one another, as well as with the tank 438 and with the shaping section 448 of the nozzle 436 of FIG. 4C. The shaping section 448 also defines a diameter, not indicated here, which is a similar diameter as compared to the overall diameter of the dissipative section yet larger than the distance between each set of the four sets of parallel plates 444A, 444B, 444C, 444D of the dissipative section 426. The shaping section 448 further defines a length, lS 450. This provides a nozzle 436 having a geometrically constricted dissipative section 442 as compared to the tank 438 and the shaping section 448, regardless of the overall diameter of the nozzle 436 itself. In an embodiment of nozzle 436 the dissipative section 426 obstructs fluid motion through the cross-shaped channel. The fluid through this section resembles flow between parallel plates, so the relaxation time scales as the square of the thickness of the cross. By adding more arms or sets of parallel internal walls or plates to the interconnected channels forming the cross, an asterisk for example, the overall area of the cross-channel of the dissipative section 426 can be increased without changing the relaxation time, making it possible to push the fluid more uniformly, decreasing the speed at which the fluid needs to transverse the dissipative section 426, and hence making a more robust and energetically efficient nozzle. In some embodiments, it may be assumed that the area of the cross-channel of the dissipative section 426 is smaller than the area of the exit orifice of the shaping section 448. In certain embodiments, the dissipative section of a cross-channel type nozzle may have six interconnected channels, eight interconnected channels, or more. While no theoretical limit to interconnected channels is known, the resulting total cross-sectional area should not exceed that of the shaping section as to maintain a constricted dissipative section.

Figure 4D:
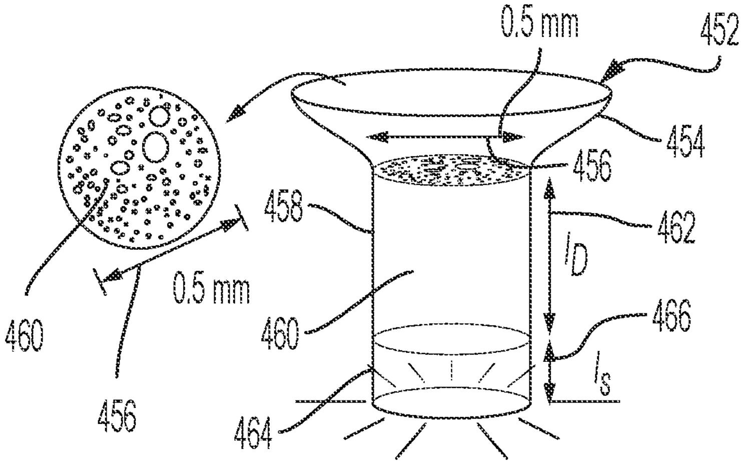

FIG. 4D shows a nozzle embodiment having an obstructive medium dissipative section. An exemplary embodiment of the obstructive medium nozzle 452 defines a tank 454 having a given diameter 456 as indicated. The tank 454 is a reservoir or receptacle for liquid or molten printing material, which is not included in this view. The tank 454 is in fluid communication with a dissipative section 458, which in this embodiment is overall shown as a cylinder. The dissipative section 458 includes obstructive media 460 which constricts fluid flow though the dissipative section 458 by having multiple random pathways or channels therethrough. The pathways through the obstructive medium 460 may be interconnected along a length of the dissipative section 458. Options for obstructive medium or otherwise porous media may include foam such as a polymeric foam, ceramic, or metal-based foam such as titanium foam, depending on the temperature and nature of the printing media. Furthermore, alternate embodiments may have varied permeability or porosity values depending on system requirements. The dissipative section 458 further defines a length, $l_D$ 462. Printing material is fed from the tank 454 to the dissipative section 458 via gravity, positive pressure, or other means known to those skilled in the art. The dissipative section 458 and in particular the obstructive medium 460 is in fluid communication with a shaping section 464. It should be noted that internal channels formed by the obstructive medium 460 may also be in direct fluid communication with one another, as well as with the tank 454 and with the shaping section 464 of the nozzle 452 of FIG. 4D. The shaping section 464 also defines a diameter, not indicated here, which is a similar diameter as compared to the overall diameter of the dissipative section 458 yet larger than the theoretical diameter of any combined channels within the obstructive medium 460 in the dissipative section 426. The shaping section 464 further defines a length, $l_S$ 466. This provides a nozzle 452 having a geometrically constricted dissipative section 458 as compared to the tank 454 and the shaping section 464, regardless of the overall diameter of the nozzle 452 itself. Unlike the geometric-based obstructions illustrated in FIGS. 4A-4C, the nozzle having an obstructive medium shown in FIG. 4D illustrates a nozzle which may provide energy dissipation by controlling the permeability properties of the medium.

Figure 5B:
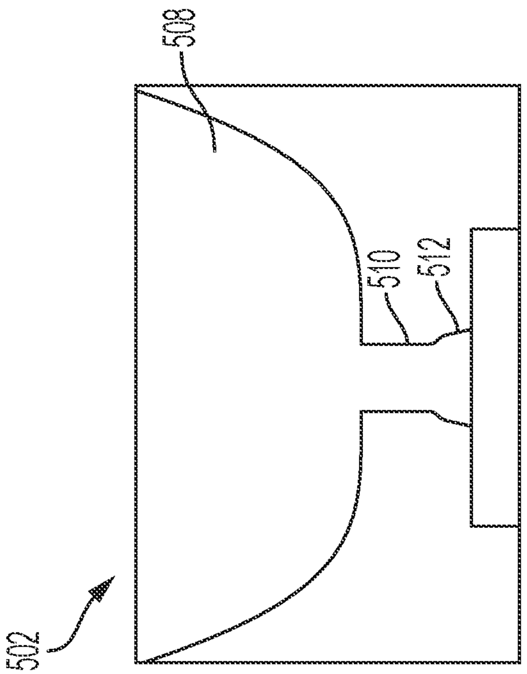
FIGS. 5A and 5B illustrate schematic cross-sectional side views of an unconstricted and a constricted nozzle design, respectively, according to one or more embodiments disclosed.
Figure 5A:
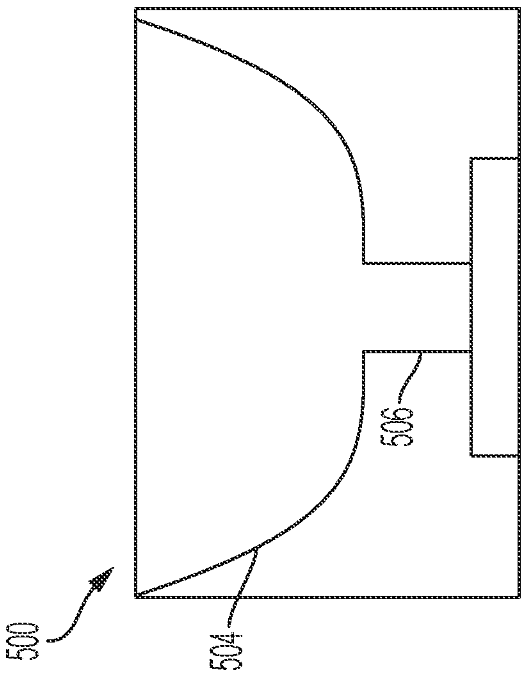

FIGS. 5A and 5B illustrate schematic cross-sectional side views of an unconstricted and a constricted nozzle design, respectively, according to one or more embodiments disclosed. FIGS. 5A and 5B illustrate the distinction between a standard unconstricted nozzle 500 of FIG. 5A and a constricted nozzle 502 with a dissipative section 510 designed as a constriction in FIG. 5B. The constricted nozzle 500 of FIG. 5A consists of a tank section 504 and a shaping section 506. In the unconstricted nozzle 500, the meniscus settling time and droplet characteristics cannot be independently controlled. FIG. 5B also defines a tank section 508, the constricted dissipative section 510, and a shaping section 512, showing a more generalized embodiments of the exemplary embodiments described herein. To illustrate and confirm the effect of the constriction on the relaxation time and the shape of the droplet under these various conditions, high-fidelity simulations that solve the governing equations of the fluid may be performed utilizing the open-source software OpenFOAM2, obtained from https://www.openfoam.com. Example simulations are described in the Examples and illustrated in FIGS. 6A and 6B for standard and constricted axisymmetric designs.

Figure 6B:
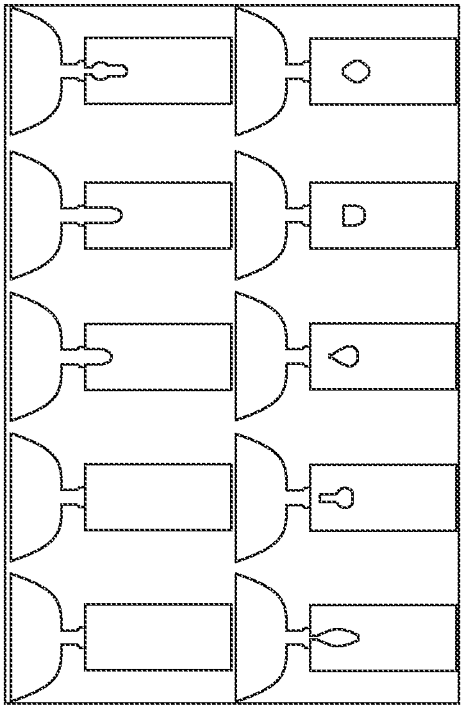
FIGS. 6A and 6B illustrate schematic cross-sectional side views of simulations generated using a standard and constricted axisymmetric nozzle design respectively, presented at various time instants, according to one or more embodiments disclosed.
Figure 6A:
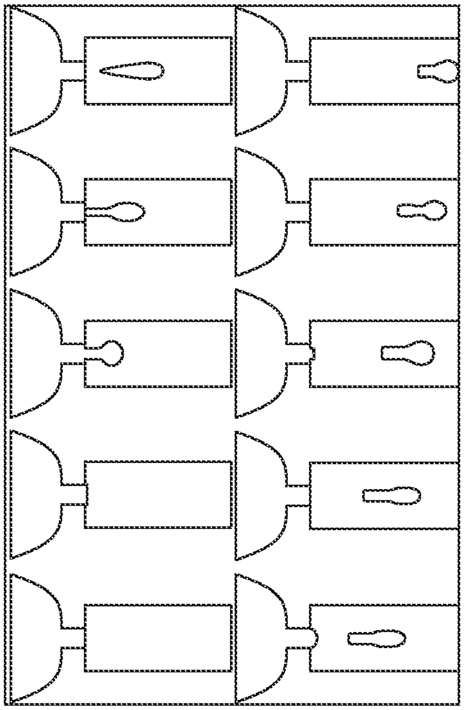

FIGS. 6A and 6B illustrate schematic cross-sectional side views of simulations generated using a standard and constricted axisymmetric nozzle design respectively, presented at various time instants, according to one or more embodiments disclosed. FIG. 6A shows a series of snapshots from an OpenFOAM2 droplet simulation study generated using a standard, or unconstricted channel nozzle. The successive images shown are representative of snapshots of the simulated droplets taken at times (t) where t=0, 0.1, 0.2, 0.3, 0.4, 0.5, 0.6, 0.7, 0.8, and 0.9 msec, respectively. FIG. 6B shows a series of snapshots from an OpenFOAM2 droplet simulation study generated using an axisymmetric or constricted channel nozzle. The successive images shown are representative of snapshots of the simulated droplets taken at times (t) where t=0, 0.1, 0.2, 0.3, 0.4, 0.5, 0.6, 0.7, 0.8, and 0.9 msec, respectively.

Figure 7:
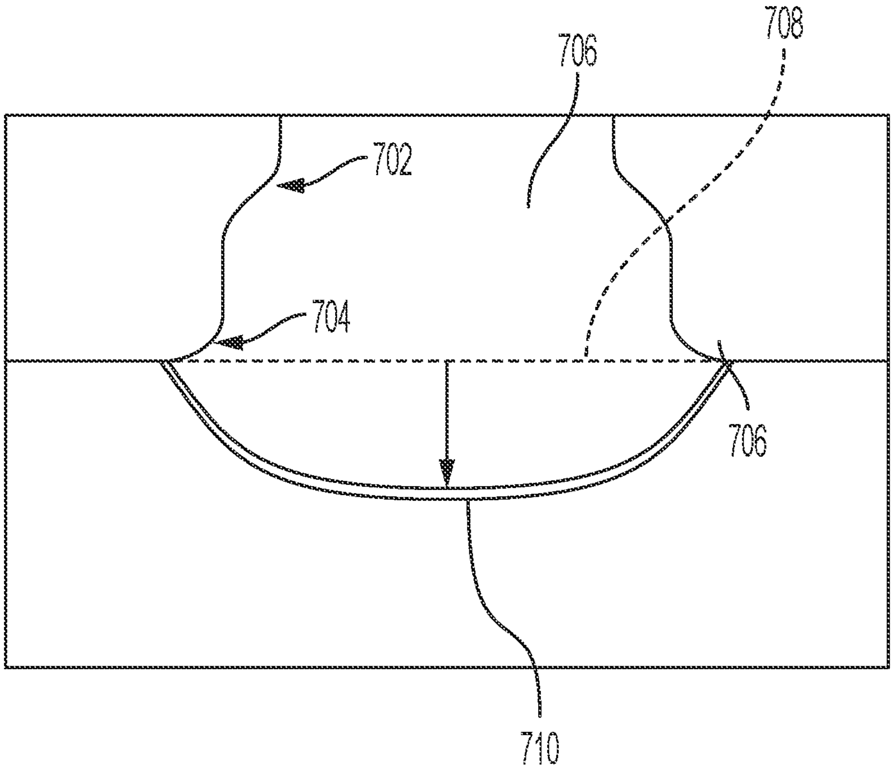
FIG. 7 is a cross-sectional side view illustrating the concept of meniscus displacement relative to a front face of an embodiment of a nozzle, according to one or more embodiments disclosed.

FIG. 7 is a cross-sectional side view illustrating the concept of meniscus displacement relative to a front face of an embodiment of a nozzle, according to one or more embodiments disclosed. Nozzle 700 has a general structure similar to other embodiments described herein and includes an exit portion of the dissipative section 702 shown leading to an exit orifice 704 of the shaping section of the nozzle 700. The nozzle 700 is filled with printing material 706, which may be jetted from the nozzle 700 when the nozzle 700 is included in an array of nozzles, printhead assembly, or printing system. A plane of a front face of the nozzle 708 is indicated as a reference point for the location of printing material 706 within a nozzle 700 at an ideally quiescent state. During printing operations, as a printing material is jetted from a nozzle and a droplet detaches, a position of meniscus displacement 710 is shown. This boundary and location of meniscus displacement 710 shows an interface boundary which oscillates as the printing material 706 still within the nozzle settles after droplet detachment. The time associated with this meniscus displacement and settling defines the relaxation time, $\tau$, associated with a particular nozzle design.

Figure 8:
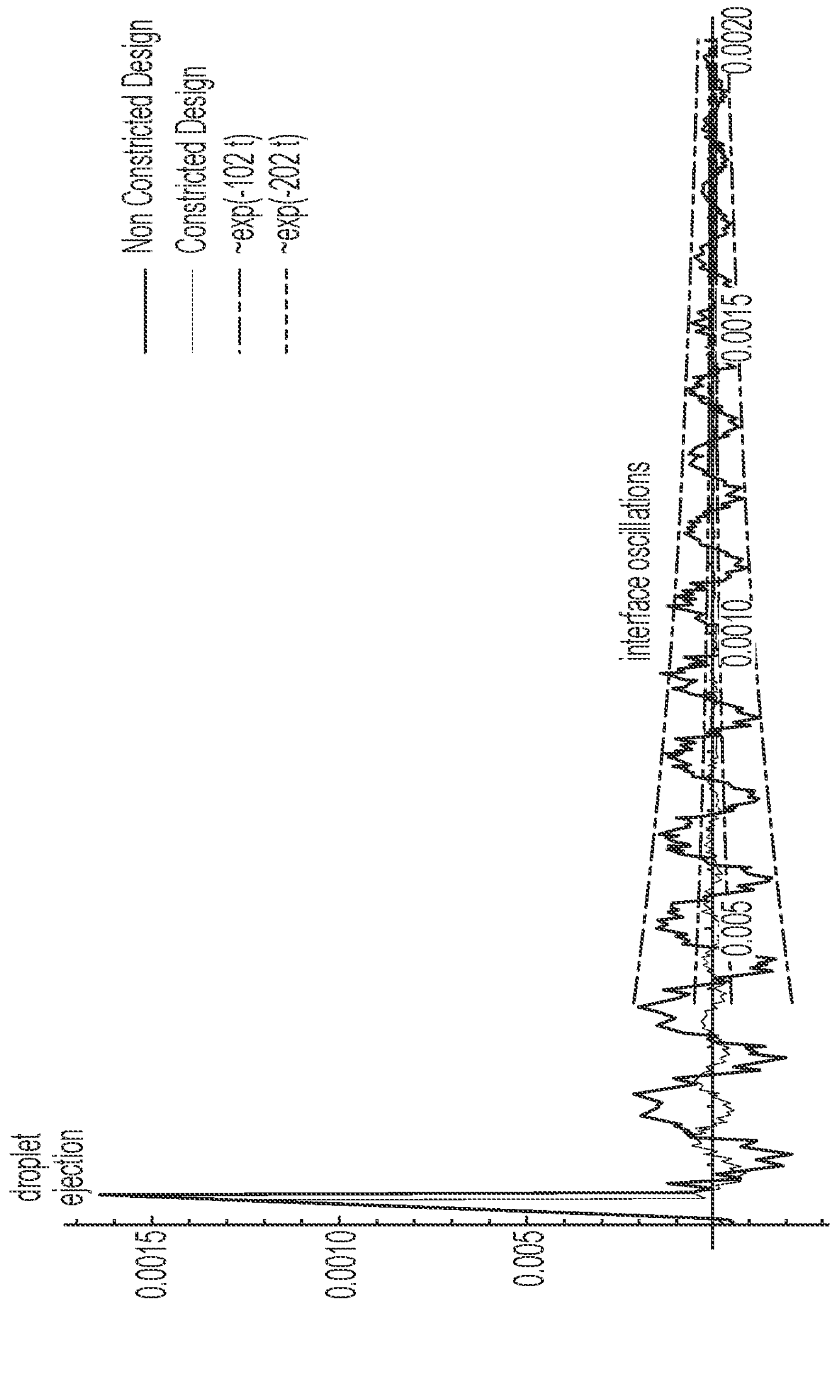
FIG. 8 is a plot illustrating a simulated meniscus displacement as a function of time for the ejection of one droplet from the constricted and unconstructed nozzle embodiments of FIGS. 6A and 6B.

FIG. 8 is a plot illustrating a simulated meniscus displacement as a function of time for the ejection of one droplet from the constricted and unconstructed nozzle embodiments of FIGS. 6A and 6B. Both the unconstricted nozzle and constricted nozzle curves illustrate the meniscus displacement and associated oscillations of the meniscus as it settles back to a plane of a front face of a nozzle as shown and described in regard to FIG. 7. The plot in FIG. 8 shows meniscus displacement as a function of time for the unconstricted nozzle and constricted nozzle. The plot in FIG. 8 also illustrates an exponential decay fitted to each curve for the unconstricted nozzle and constricted design nozzle, which defines the relaxation time, $\tau$, for both the unconstricted nozzle and constricted nozzle, respectively. The plot clearly shows the reduction of the relaxation time due to the constricted dissipative section in the constricted nozzle design as compared to the unconstricted nozzle design. Also observable is the reduced magnitude of the oscillations for the constricted dissipative section in the constricted nozzle design as compared to the unconstricted nozzle design.

Designing the Shaping Section

In certain embodiments, the required relaxation time of a nozzle design defines the ratio $A\delta/S$ for the dissipative section, where A is the dissipative section channel cross-sectional area, $\delta$ is a characteristic length for the fluid boundary layer inside the dissipative section, and S is the perimeter of the dissipative section cross-section. The value of $\delta$ is always smaller or equal than smallest characteristic dimension of the cross section, so its upper bound is also defined by the geometry. The required volume of the droplet and its speed define the cross-sectional area of the exit orifice of the shaping section of a nozzle. The volume of the droplet is approximately proportional to $R^3$, where R is the radius of the exit orifice in the shaping section. Therefore, if the velocity of the center of mass of the droplet is V, then the velocity inside the dissipative section should be $\approx V\pi R^2/A$. Since A can be chosen to be close to $\pi R^2$ by selecting a cross section for the dissipative section with an appropriate S, it is possible to design a nozzle such that this speed is very close to that of the center of mass. For example, in an embodiment according to a nozzle design as illustrated in FIG. 4C, the nozzle embodiment having a cross-channel dissipative section, if additional sets of parallel plates are increased from 4 to 6 set of parallel plates, A grows, but A/S remains roughly constant. This speed then defines the strength of the pressure signal to use when jetting printing material from a nozzle designed as described herein.

In regard to the shape of the exit orifice in certain embodiments, several possible shapes could be considered, such as an elliptical orifice or a narrow slit, but the circular orifice may be generally known to those skilled in the art as ideal in obtaining a single droplet per pulse. Therefore, the following discussion is based on an exit orifice of circular shape. In certain embodiments, the diameter of the exit orifice of the shaping section dictates the droplet volume and shape ejected from a nozzle. In the instance of a very small diameter a long droplet would need to be generated by the nozzle to attain a given mass, and such droplet would be ejected before reaching such mass. An analogous argument can be made about a large diameter, in that a larger diameter nozzle may require a waveform having a longer pushing time, which could result in elongated droplets of unacceptable shape. Thus, a mechanism to prevent the meniscus edge of a droplet from moving beyond the plane of the front face of the exit orifice is needed. In some embodiments, this can be implemented with the use of a sharp edge, a sharp surface irregularity, or a modification of the contact angle properties of the printing material. The radius of curvature, $\rho$, at the exit orifice, as shown and described in regard to FIG. 3 defines the dynamics of the meniscus. If this radius of curvature, $\rho$, is very small with respect to the radius of the exit orifice, then the meniscus will be largely pinned to the edge of the exit orifice. If the radius of curvature, $\rho$, is a significant fraction of the radius of the exit hole (for example, 10%), then the meniscus will move up and down the curvature of the exit orifice to a greater extent as it oscillates after the droplet is ejected from the nozzle. Therefore, the radius of curvature, $\rho$, in certain embodiments, may be less than 10 percent of the radius of the exit orifice in terms of controlling meniscus behavior at the exit orifice.

In certain embodiments of a nozzle design, the length of the shaping section influences several factors. A very long shaping section in a nozzle can result in the ejection of two droplets: a slow one due to pressure generated by the incoming printing material fluid, and a second one if the jet of fluid entering the shaping section from the dissipative section is not sufficiently slowed down or dissipated. In other embodiments, when a shaping section is of an intermediate length, the shaping section design provides a way for the incoming printing material fluid to increase the pressure in the shaping section and push the printing material fluid presently in the shaping section to form a larger droplet. For a printing material fluid with large enough viscosity, the length of the exit region may be tailored to homogenize the velocity of the fluid before forming the droplet. The practice of this design strategy may be impractical for aluminum, a material of interest in DOD 3d printing applications. As stated previously, the exit orifice of the nozzle may provide a stable equilibrium of the meniscus, particularly if the contact angle of the fluid is wetting in contact with the nozzle. Further, if the area of the cross-section of the dissipative section is smaller than that of the exit orifice, then the exit of the dissipative section can provide a second stable equilibrium with smaller potential energy. Therefore, the length of the shaping section may provide a potential energy barrier to prevent the meniscus from traveling from the exit orifice to the exit of the dissipative section during jetting operations. This described balance between the design of the shaping section and the design of the dissipative section to minimize the relaxation time, $\tau$, of the nozzle may also be utilized and leveraged in nozzle design to prevent vortices and recirculation spots from forming within the nozzle if the fluid is viscous enough. This is not the case for Aluminum, or water. Water or alloy materials used in metal printing are not very viscous and hence prone to complex phenomena that occur at the intersection of dissipation and shaping sections while applying pressure pulses. One phenomenon is secondary vector fields or vortices that develop and perturb the desired vertical motion. Another phenomenon observed is that due to low viscosity the meniscus at a nozzle face may, after an ejection, retract and settle at a different position than the tip of nozzle, such as an intersection between dissipative and shaping sections, or deep inside the nozzle.

Since the relaxation time, $\tau$, of a nozzle scales with the dimensions of the dissipative section, a smaller dissipative section leads to a faster relaxation time, resulting in less disturbance at the meniscus during jetting. However, this constraint on smaller diameter of the dissipative section also limits the volume of the droplet. Alternate embodiments of printing systems utilizing principals of nozzle design as described herein may include arrays of multiple nozzles having a small relaxation time placed close enough to one another such that the generated droplets merge while falling, and thus the overall volume of a droplet jetted can be increased by combining multiple nozzles while retaining a small relaxation time. In certain embodiments, droplets may merge into a single larger droplet if the amplitude of the transversal oscillations of the droplet shape while falling is larger than the distance between the nozzles. The pressure signal for multiple nozzles in parallel can be adapted from that of a single nozzle with little or no modifications. This described embodiment is analogous to the example of the nozzle having a shower-head channel dissipative section as illustrated in FIG. 4B without the shaping section. This is an example of a use of multiple nozzles jetting in parallel, provided the channels are placed close enough to each other.

SIMULATION EXAMPLES

The following Examples are being submitted to further define various aspects of the present disclosure. These Examples are intended to be illustrative only and are not intended to limit the scope of the present disclosure. Multiple test cases utilizing high-fidelity simulations of multi-sectional nozzle designs are conducted and the resulting nozzle jetting behavior is monitored with respect to single and multiple droplet events. The two areas of focus are to highlight the effect of energy dissipation in printing/jetting throughput and evaluate basic parametric analysis to study the sensitivity of throughput metrics with respect to basic nozzle characteristics. The outputs of interest related to these simulations are droplet characteristics of interest, i.e., droplet speed, volume and shape, as well as energy dissipation metrics, i.e. relaxation time of meniscus displacement. The studies conducted in the example studies have been restricted to the constricted axisymmetric channel nozzle design and the shower-head multichannel designs, as illustrated in FIGS. 4A and 4B, respectively.

Figure 9:
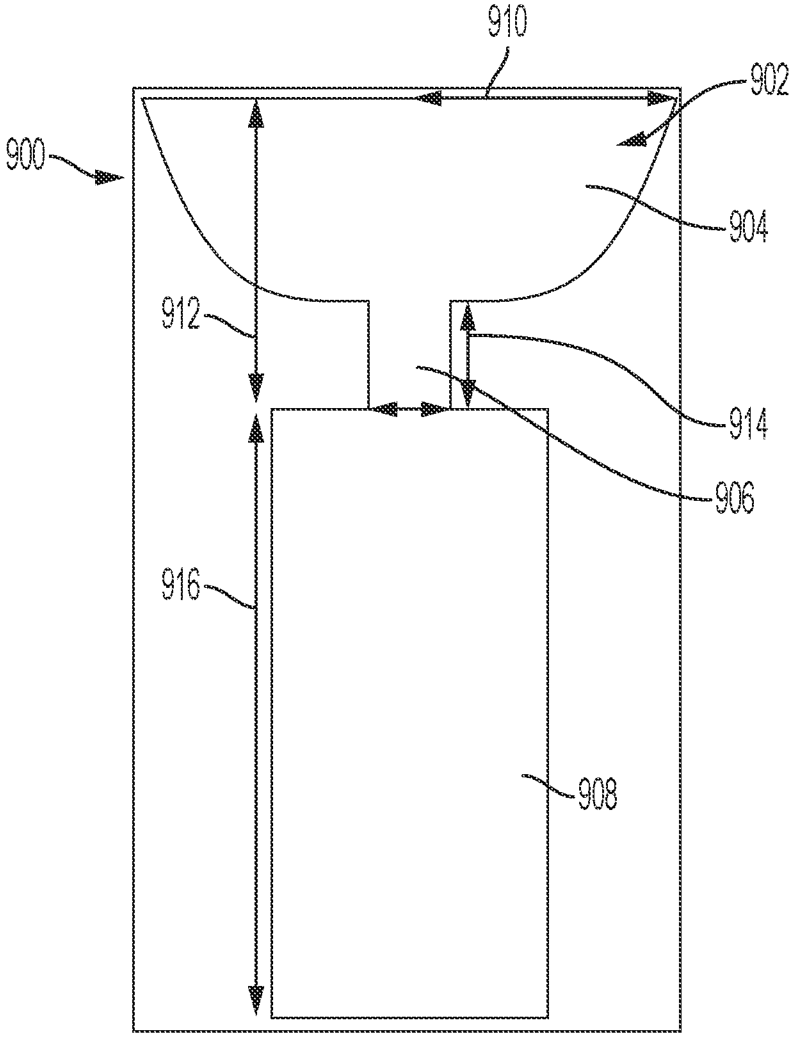
FIG. 9 illustrates a basic abstraction of the nozzle and substrate part of a printer embodiment.

FIG. 9 illustrates a basic abstraction of the nozzle and substrate part of a printer embodiment. A nozzle 900 defines a tank 902 and a constricted axisymmetric section 906 and is shown having fundamental dimensions—a radius 910 of the tank 902, a length 912 of nozzle 900, a length 914 of the constricted axisymmetric section 906, and a length 916 of a gas phase atmosphere 908 which are considered fixed for the simulations and two phases initialized, a liquid phase consisting of a model liquid printing material 904, and the gas phase 908. The first phase is liquid with properties resembling the ones of melted aluminum alloy at temperature above melting as a representative printing material. The second phase is gas with properties similar to an external atmosphere, for example, argon atmosphere. The values of the aforementioned properties used, are presented in Table 1. Finally, the contact angle between the wall of the nozzle and the liquid/gas interface, is assumed uniform and set to 60 degrees.

TABLE 1

Gas/Liquid Phase Properties

| Phase | Gas | Liquid |
|---|---|---|
| Viscosity ($m^2/s$) | $2.59 \cdot 10^{-5}$ | $4.16 \cdot 10^{-7}$ |
| Density ($kg/m^3$) | 1.6228 | 2435.04 |
| Surface Tension (N/m) | 0.585 | 0.585 |

Figure 10:
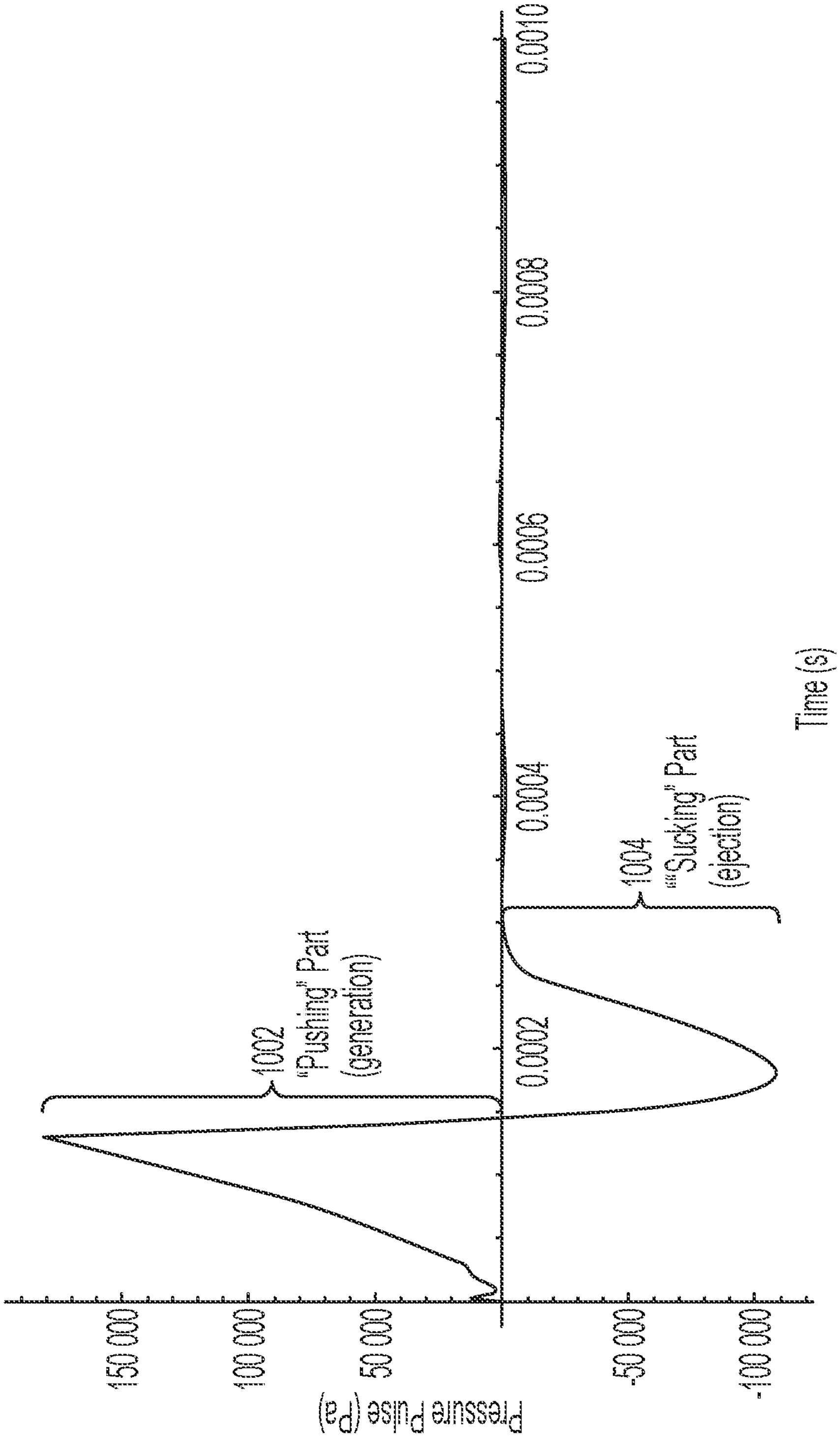
FIG. 10 illustrates a plot of a waveform representative of a pressure pulse applied at an upper boundary of a nozzle, according to embodiments herein.

FIG. 10 illustrates a plot of a waveform representative of a pressure pulse applied at an upper boundary of a nozzle, according to embodiments herein. This input signal is a pressure pulse applied at the upper boundary of the nozzle, set at 4.5 mm from a substrate. The signal has the incoming pulsed waveform illustrated in FIG. 10. It consists of a positive pressure (pushing) component 1002 and a negative pressure (sucking) component 1004. The positive pressure component of the waveform may be referred to as a generation event, or the positive generation portion of the waveform and generates the droplet while the negative pressure component of the waveform, which may also be referred to as an ejection event, or a negative ejection portion of the waveform, component controls its detachment from the orifice. To operate the nozzle and eject droplets with prescribed shape, volume, and speed, an appropriate pressure pulse/signal in time at an interface between the tank and dissipative section is required. Such signals may consist of two clearly identifiable sections in time, an initial push followed by a pull, as illustrated in FIG. 10. The push section compresses the fluid in the tank and pushes it through the dissipative and shaping section of the nozzle, inflating the meniscus at the exit orifice of the shaping section. The pull section sucks the fluid within the nozzle and may slow it down, generating a sharp variation of the velocity of the fluid near the exit orifice. Accordingly, the fluid in the inflated meniscus continues moving forward away from the nozzle, but the fluid still within the nozzle is slowed down by the pull component of the waveform. This generates a breakup point from where the droplet detaches near the exit orifice. If the speed of the fluid within the meniscus is large enough, a droplet may emerge without the need for a pull section; and the meniscus then stretches to the point that a concave region with low pressure appears and the droplet breaks up from there. The pull section of the signal enables a degree of control of when and how the droplet detaches from the fluid in the nozzle. The speed, volume and number of droplets per pulse within a range can be calibrated by tailoring the strength and duration of each part of the pressure signal.

Monitored quantities in the simulation examples include observations related to the generation of single droplets of candidate nozzle designs according to embodiments herein. Given a nozzle geometry and input signal, it is verified that: (a) a single droplet is generated, the droplet is of appropriate shape (close to spherical), and (b) the droplet remains a single droplet (i.e., without splitting into smaller droplets) throughout its trajectory. Droplet volume as a surrogate of droplet mass is quantified as well. As the model printing material fluids are incompressible for this application, volume is a conserved quantity. Droplet velocity is recorded as the volume-averaged velocity, which is the velocity of the center of mass of the droplet. It is considered constant due to the negligible effect of gravity. Meniscus relaxation time is the characteristic time $\tau$ in the exponential fitting C $\exp(-t/\tau)$ of the envelope of the time variation of the meniscus displacement after a droplet is ejected, as shown in FIG. 8. The relaxation time is a measure of how fast the excess kinetic energy of the fluid inside the nozzle is dissipated. A computational fluid dynamics (CFD) solver may be used to execute a simulation in the OpenFOAM platform, implementing the InterFoam routine. This routine is a solver for two incompressible, isothermal immiscible fluids using a volume-of fluid numerical approximation.

For the constricted axisymmetric nozzle design simulation, a single droplet event includes one pressure pulse applied at the top of the upper tank, thereby ejecting one droplet. FIGS. 6A and 6B present snapshots of standard and constricted nozzle designs, respectively, satisfying the axisymmetric hypothesis. The system response is monitored by recording the trajectory of the interface by plotting the maximum displacement, as illustrated in FIG. 7 as a function of time, which yields plots similar to the plot illustrated in FIG. 8. The resulting plots show free meniscus oscillations after droplet ejection recorded for both a standard and a constricted nozzle design. In both simulations, an initial spike indicates the moment of droplet generation and breakup, followed by the damped oscillations as the meniscus relaxes. The data associated with the unconstricted design is a realization of a freely oscillating meniscus after a single droplet ejection in a standard (unconstricted) nozzle. In this particular case, the nozzle design is similar to the nozzle design represented in FIG. 5A with a diameter of 500 μm for an exit orifice. The relaxation time $\tau$ is upper bounded by 9.82 msec. The data associated with the constricted axisymmetric design of FIG. 5B is an identical simulation run on a constricted nozzle, with a constriction radius of 170 μm and a constriction length of 400 μm. The length of the shaping section is 100 μm the radius of the exit orifice equal to 250 μm. In this case, meniscus settling occurs significantly faster, with $\tau \leq 4.95$ msec. The ratio of the relaxation times is very close to the ratio of the areas, as expected from the formulae described previously.

Behavior of the Nozzles at Different Pulsing Frequencies

Figure 11C:
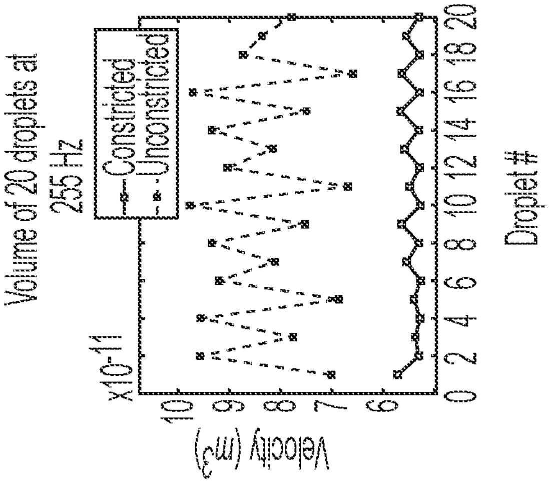
FIGS. 11A-11F are a series of plots illustrating multiple droplet simulations of constricted and unconstricted nozzles, for three jetting frequencies according to embodiments herein. Droplet volume and volume-averaged velocities are plotted versus droplet number.
Figure 11B:
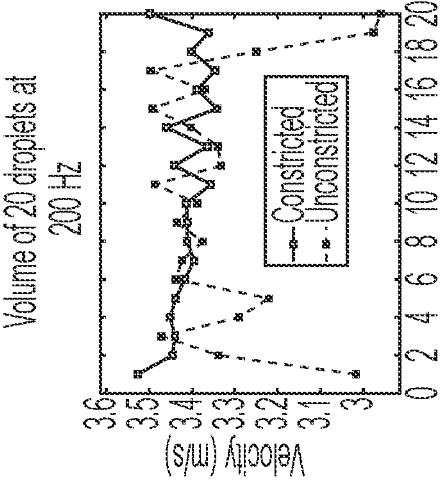
Figure 11A:
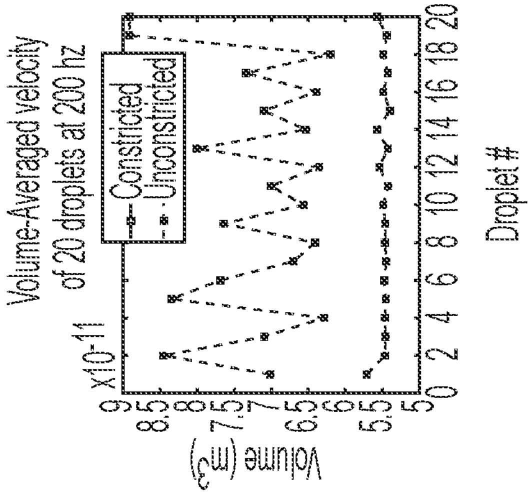
Figure 11D:
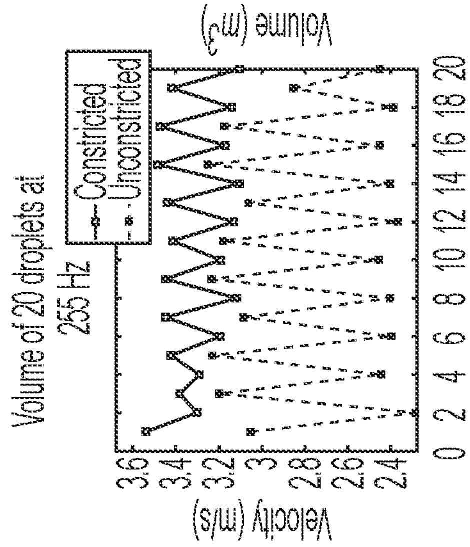
Figure 11E:
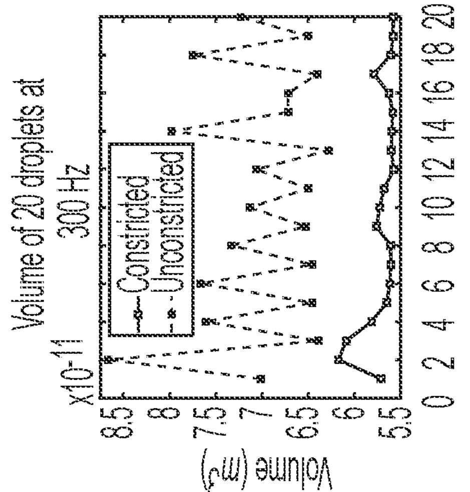
Figure 11F:
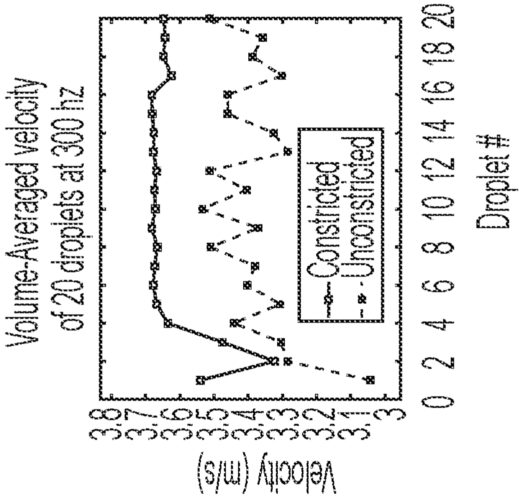

The behavior of the same constricted and unconstricted nozzles was then studied upon repeating a pressure pulse periodically in time with different frequencies resembling those used while printing in steady-state operation. Simulations were conducted in which 20 droplets are ejected with frequencies of 200 Hz, 255 Hz and 300 Hz. FIGS. 11A-11F are a series of plots illustrating multiple droplet simulations of constricted and unconstricted nozzles, for three jetting frequencies according to embodiments herein. Droplet volume and volume-averaged velocities are plotted versus droplet number. In FIGS. 11A, 11C, and 11E, drop volume for 20 droplets is plotted for 200 Hz, 255 Hz, and 300 Hz, respectively. In FIGS. 11B, 11D, and 11F, volume-averaged velocity of 20 droplets is plotted for 200 Hz, 255 Hz, and 300 Hz, respectively. The standard deviation of the volume and volume-averaged velocities over the 20 droplets plotted in FIGS. 11A-11F are presented in Table 2. It was also noted that for the unconstricted nozzle design 85%, 45% and 80% of ejected droplets broke apart before reaching the substrate, at firing frequencies 200 Hz, 255 Hz and 300 Hz, respectively. The corresponding rates in the constricted nozzle design are 0%, 0% and 10%, at firing frequencies 200 Hz, 255 Hz and 300 Hz, respectively. In all tested jetting frequencies, the results of the constricted nozzles display a very regular behavior from droplet to droplet, in contrast to the wilder variations of the unconstricted nozzle design.

TABLE 2

| Standard Deviation of Droplet Specs | | | |
|---|---|---|---|
| | 200 Hz | 255 Hz | 300 Hz |
| Constricted | | | |
| Velocity (m/s) | 0.049 | 0.152 | 0.089 |
| Volume ($10^{-12}$ $m^3$) | 0.704 | 1.58 | 1.65 |
| Unconstricted | | | |
| Velocity (m/s) | 0.169 | 0.384 | 0.114 |
| Volume ($10^{-12}$ $m^3$) | 8.82 | 10.8 | 6.48 |

Figure 12:
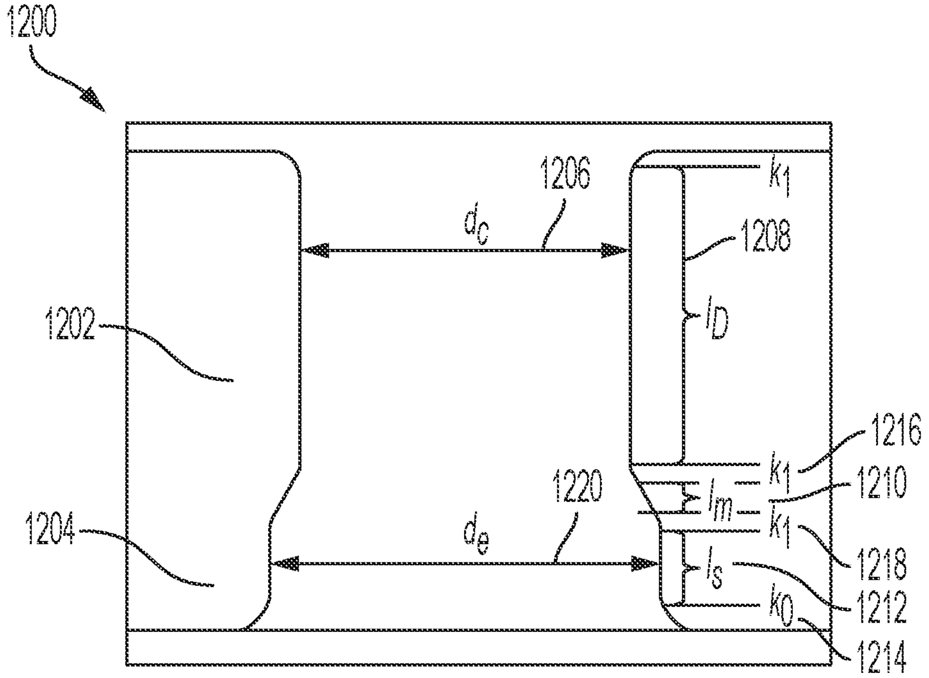
FIG. 12 illustrates a schematic cross-sectional view of a portion of a nozzle design, according to one or more embodiments disclosed, illustrating parameterization of the constricted axisymmetric nozzle design.

FIG. 12 illustrates a schematic cross-sectional view of a portion of a nozzle design, according to one or more embodiments disclosed, illustrating geometric considerations related to the constricted axisymmetric nozzle design. A nozzle 1200 design used in subsequent simulations has adjustable design parameters representing dimensions of both a dissipative section 1202 and a shaping section 1204, which are a diameter of constriction $d_c$ 1206 of the dissipative section 1202 and a diameter of an exit orifice $d_c$ 1220 of the shaping section 1204. Fixed parameters for the nozzle simulation design illustrated in FIG. 12 include a length $l_D$ 1208 of the dissipative section 1202, a transition length $l_m$ 1210 between the dissipative section 1202 and the shaping section 1204, a length is 1212 of the shaping section 1204. Other fixed dimensions include an exit orifice length $\kappa_0$ 1214, an upper $\kappa_1$ 1216 and a lower $\kappa_1$ 1218, which represent transition lengths of merging parts, or transition zones that connect the various sections of a nozzle.

Parametric Study I: Constriction Diameter

Figure 13B:
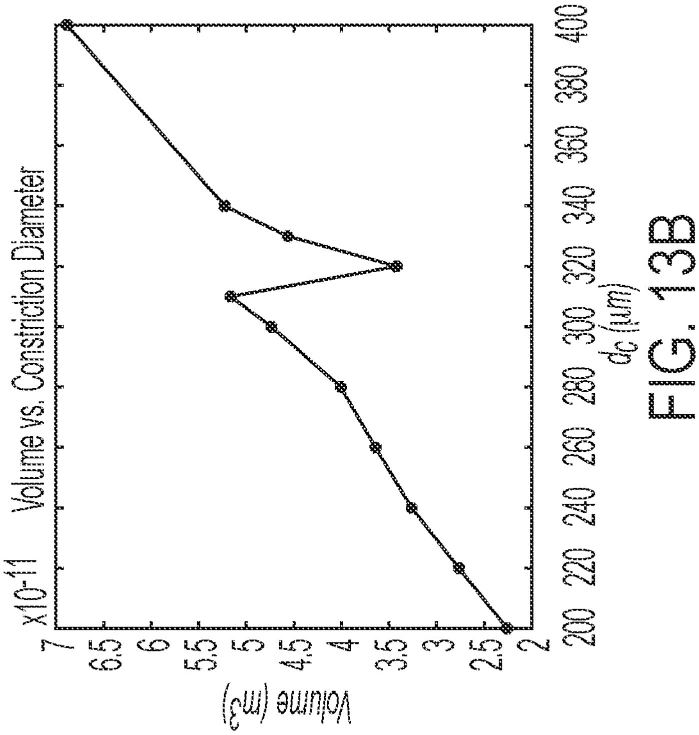
FIGS. 13A and 13B are plots of ejected droplet volume-averaged velocity as a function of constriction diameter, dc, and ejected droplet volume as a function of constriction diameter, dc, respectively.
Figure 13A:
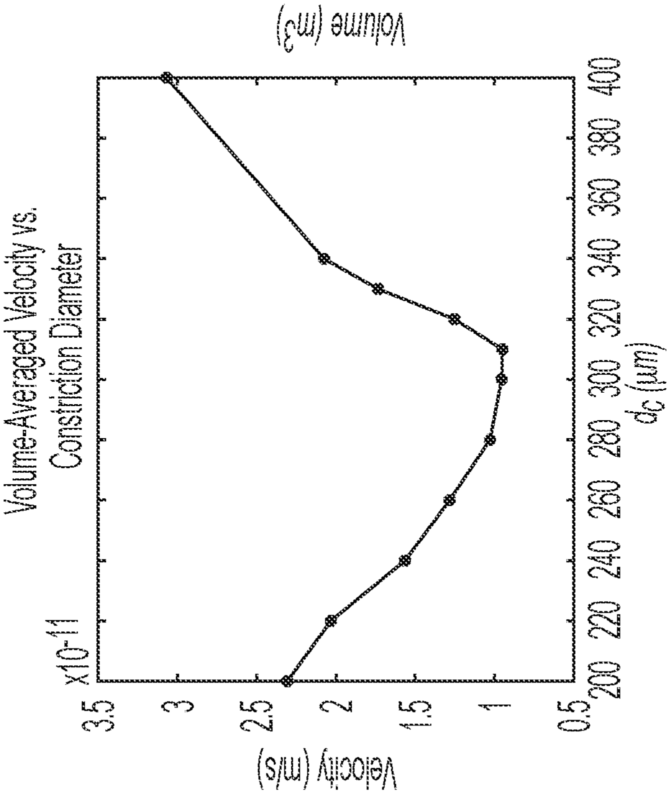

As mentioned earlier, in certain embodiments, nozzle geometry primarily controls the shape of the droplet, the droplet trajectory after break-up, its volume and speed. Also, the geometry can be modified to control the dissipation of energy. Results from the studies as shown and described in regard to FIG. 12 are presented in FIGS. 13A and 13B. FIGS. 13A and 13B are plots of ejected droplet volume-averaged velocity as a function of constriction diameter, dc, and ejected droplet volume as a function of constriction diameter, dc, respectively. As the constriction diameter decreases, the velocity and volume of the ejected mass initially decreases as well. Evidently, narrower sectional walls hinder liquid flow. Since the pressure pulse does not compensate with additional energy, the result is that less material is ejected and at slower speed. Finally, for constriction diameters dc=0.4, 0.3, 0.2 mm relaxation times were upper bounded by 0.0083 s, 0.0049 s and 0.0039 s, respectively. This is consistent with the expected relationship $\tau \propto d_c^2$. A significant change of monotonicity in the volume-averaged velocity is observed in FIG. 13B at around dc/de≈78%. The volume averaged velocity decreases steadily with dc until then, and suddenly it began to increase as dc is further decreased. At around the same value of dc a jump in the value of the ejected volume is observed. This behavior may be due to the fact that as the diameter of the constriction is decreased, the speed of the fluid inside it increases. When the fast moving fluid enters the shaping section, the viscosity of the fluid and the increase in pressure it generates is not enough to accelerate the fluid on the outer regions of the shaping section. Thus, the fluid coming from the dissipative section loses less momentum to the surrounding fluid, causing it to exit the nozzle at a faster speed. The ejected mass often involves fluid with significantly different speeds, which may result in the breakup of the droplet and sometimes in the ejection of satellites.

Parametric Study II: Input Signal

Figure 14:
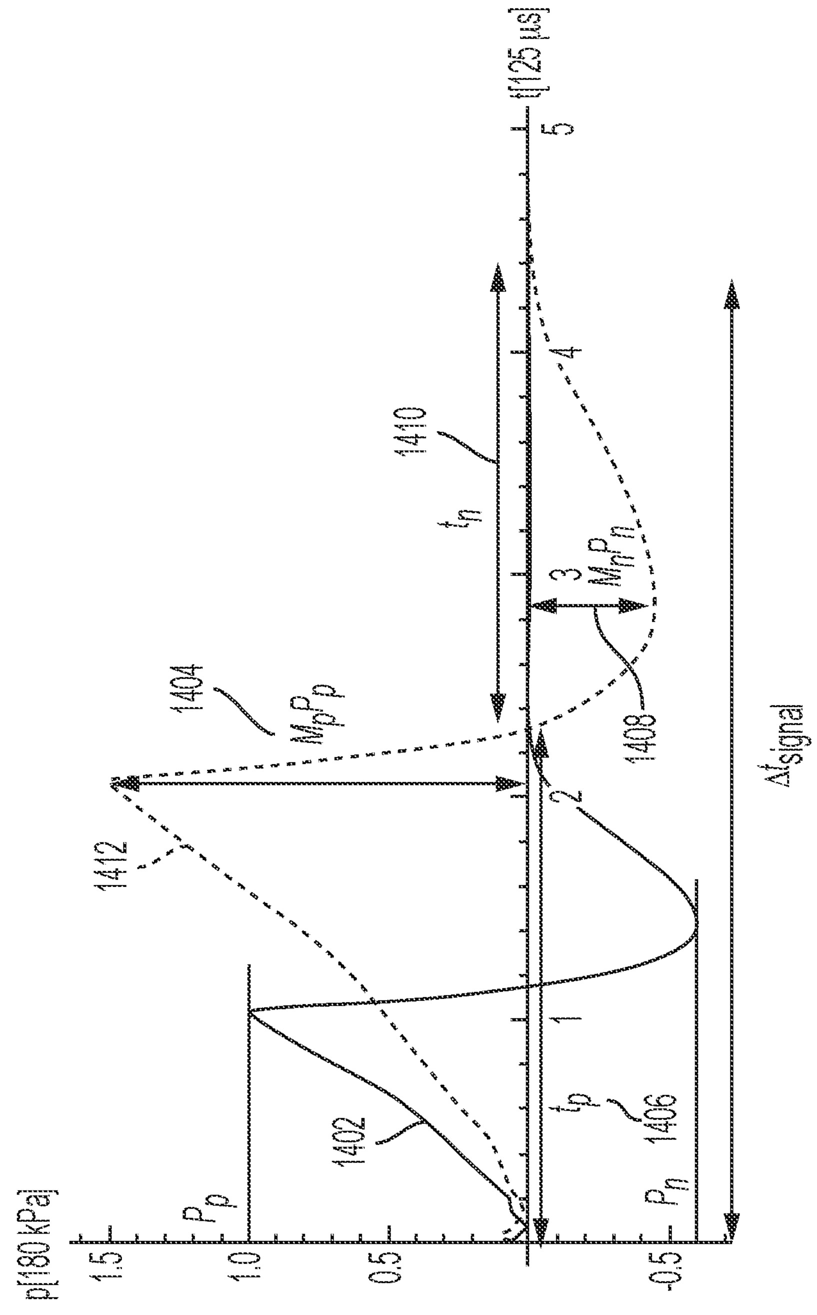
FIG. 14 is a spatio/temporal scaled plot of a characteristic waveform showing its positive and negative components, according to an embodiment.
Figure 15A:
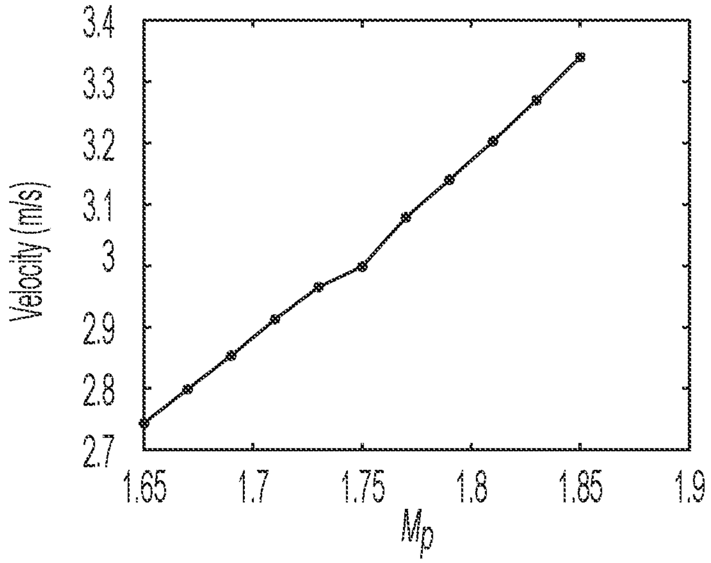
FIGS. 15A-15D are a series of four plots illustrating the results of parametric simulation of a positive part of the waveform of FIG. 14 and the waveform effect on droplet velocity and volume, according to an embodiment.
Figure 15B:
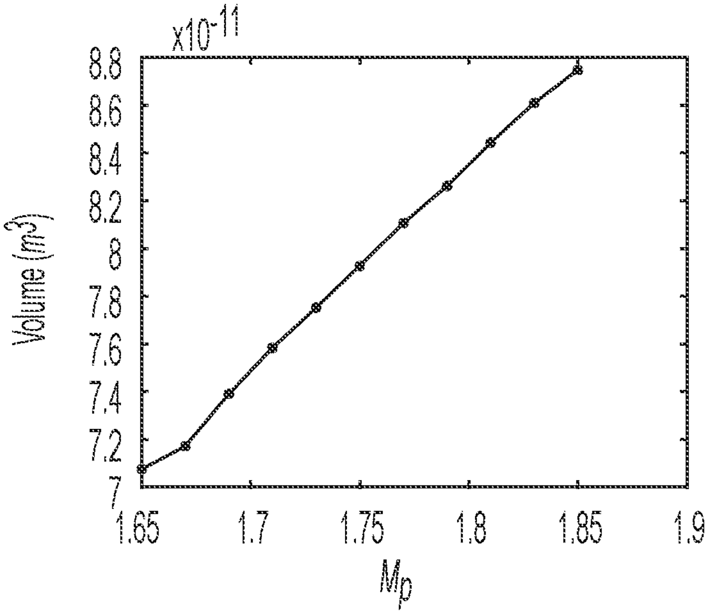
Figure 15C:
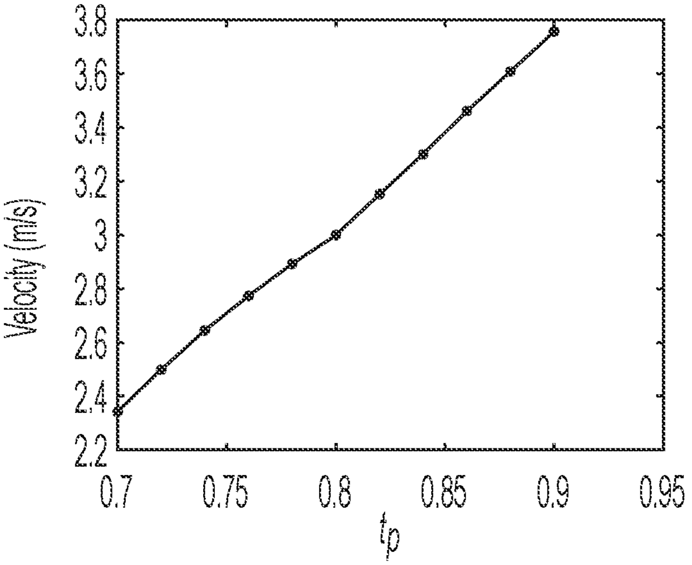
Figure 15D:
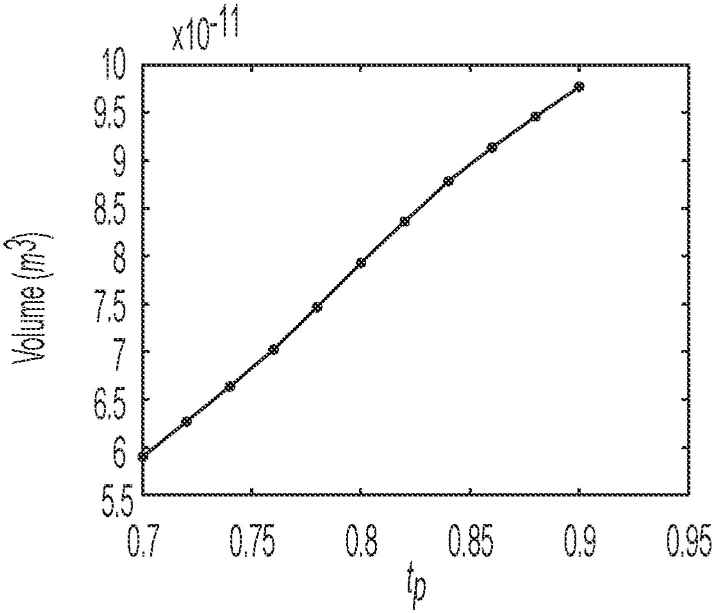

The input signal and corresponding waveform provides the energy that enters the nozzle/liquid system. It primarily controls the droplet velocity and volume and consequently it influences the break-up specifications of time and location. Secondly, the input signal affects the droplet shape and the dissipation of energy in a nozzle design simulation. In printing devices, waveforms such as the one illustrated in FIG. 10 are an output of hardware circuits that control the strength and the duration of the positive and negative parts of the signal. With a fixed the nozzle geometry, the shape of the pressure signal may be defined and adjusted to obtain droplets with the desired characteristics. One method of exploring the sensitivity of the droplet's characteristics to the pressure signal is to fix a realized waveform as a reference and introduce magnification parameters as surrogates to hardware-based controllers that affect its strength and duration. FIG. 14 is a spatio/temporal scaled plot of a characteristic waveform showing its positive and negative components, according to an embodiment. A systematic modification of a reference pulse 1402 is simulated for several parameters of the wavelength depicted in FIG. 14, by variation of parameters Mp (magnitude of the positive generation portion of the waveform) 1404, tp (duration of the positive generation portion of the waveform) 1406 that scale the positive part of the pulse, and analog parameters Mn (magnitude of the negative ejection portion of the waveform) 1408, to (duration of the negative ejection portion of the waveform) 1410 for the negative part of the pulse. This change is represented by a wavelength 1412. For the nozzle geometry design defined by dc=0.35 mm, de=0.4 mm and lD=0.05 mm, the computed results for the droplet characteristics with varying Mp and tp are shown in FIGS. 15A-15D. FIGS. 15A-15D are a series of four plots illustrating the results of parametric simulation of a positive part of the waveform of FIG. 14 and the waveform effect on droplet velocity and volume, according to an embodiment. FIGS. 15A and 15B are plots of velocity versus Mp and volume versus Mp, respectively. FIGS. 15C and 15D are plots of velocity versus tp and volume versus tp, respectively. The effect of the pushing part of the pressure pulse is illustrated, while keeping the pulling/sucking part of the waveform constant and equal to the reference signal. A strong linear behavior of droplet characteristics can be observed with respect to the pushing parameters. The smooth variation of both quantities illustrates the possibility of tailoring the signal to adjust the volume and speed of the droplet within some range. However, this smooth variation of the volume and the speed with pulse parameters does not reflect the effect they have on the droplet shape, which can be significantly altered. Pressure pulses with Mp large enough, and certainly within the range in FIGS. 15A and 15B, accelerate the fluid enough to generate droplets that are too elongated and/or that break up after ejection. Therefore, it is unlikely to form one single droplet of acceptable shape in such range. In contrast to modifying the Mp and tp values, the values of Mn and tn affect the droplet characteristics in complex way. Results of other parametric studies outside the scope of these studies suggest that large values of Mn, tn have negative effects in the dynamics. These negative effects range from slowing down the flow in the nozzle and in the ejected droplet, to inducing a large kinetic energy load, partially due to stronger sucking, that takes an undesirably long time to be dissipated.

Figure 16B:
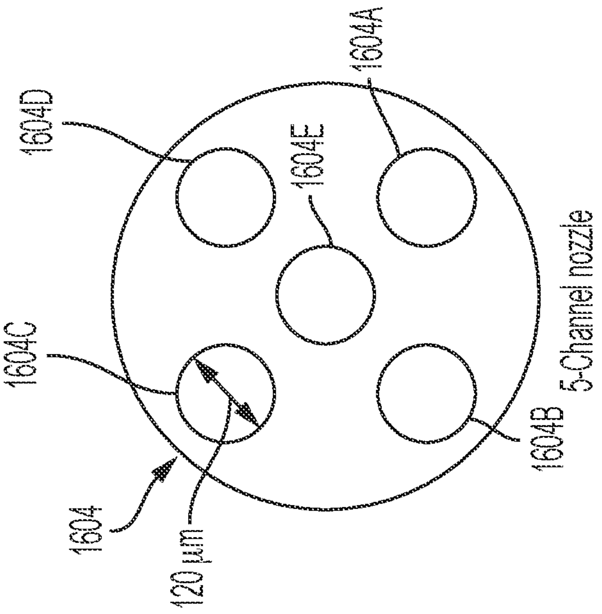
FIGS. 16A and 16B illustrate top views of a dissipative section in a multichannel nozzle having four channels and five channels, respectively.
Figure 16A:
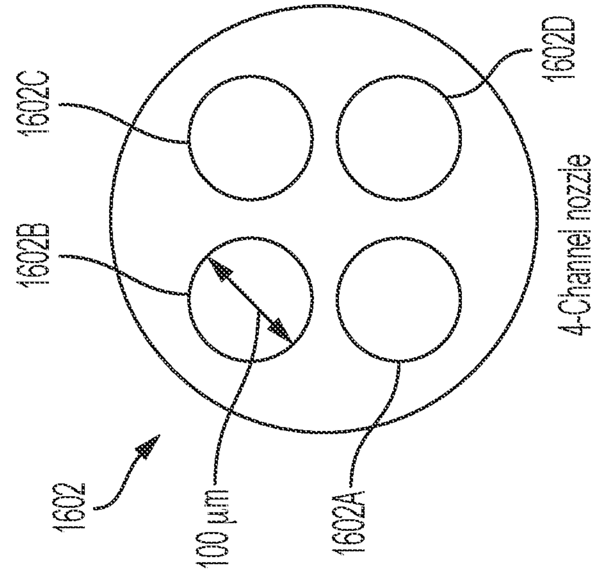
Figure 17:
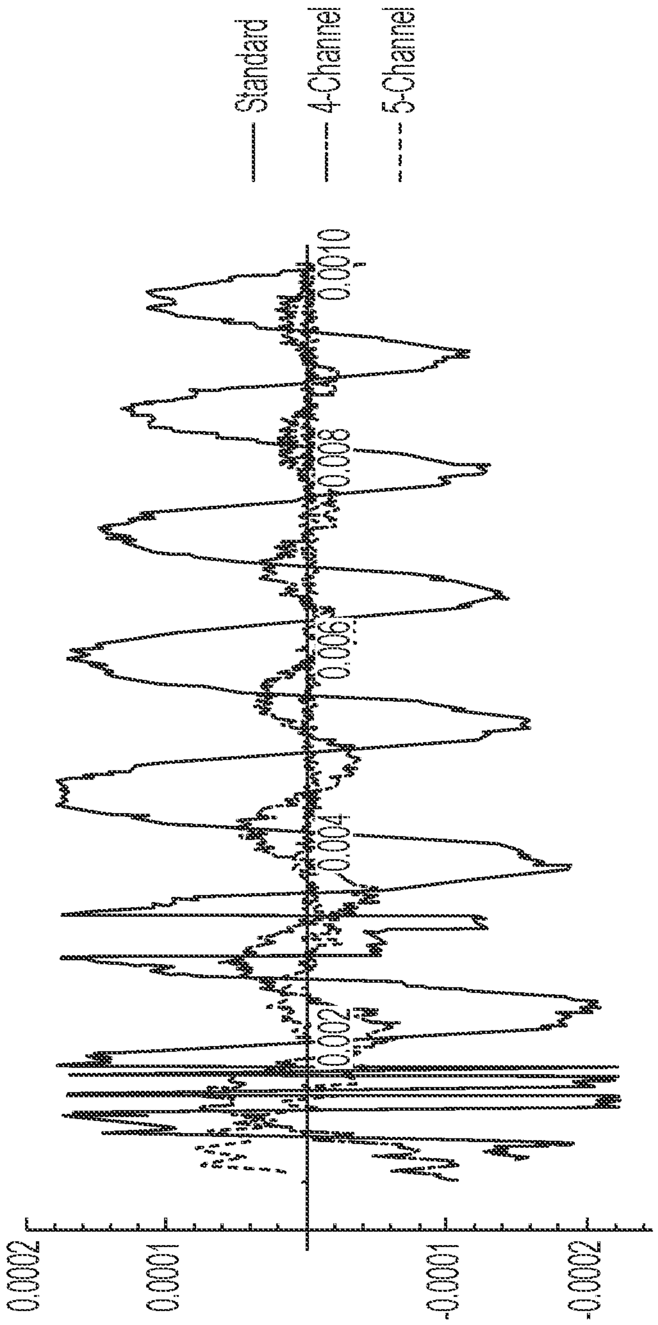
FIG. 17 is a plot illustrating a simulated meniscus displacement as a function of time for the ejection of a droplet from the multichannel nozzle embodiments of FIGS. 16A and 16B as compared to a standard unconstricted nozzle design embodiment.

Additional experiments were conducted using the shower-head multichannel nozzle design of FIG. 4B, wherein the dissipation section consists of at least two multiple narrow channels. As discussed previously in regard to FIG. 4B, the relaxation time of this channel scales with the sum of the areas of the cross sections of each narrow channel. An additional advantage of this multichannel nozzle design is that by pushing the meniscus in a more distributed manner over the exit orifice, it increases the range of speeds at which the fluid can be pulsed or jetted through the dissipative section without generating multiple droplets upon ejection. FIGS. 16A and 16B illustrate top views of a dissipative section in a multichannel nozzle having four channels and five channels, respectively. Additional studies of droplet ejection were studied using the designs illustrated in FIGS. 16A and 16B. The multichannel nozzle design 1602 of FIG. 16A contains four symmetrically placed channels 1602A, 1602B, 1602C, 1602D of 160 μm diameter each, and the multichannel nozzle design 1604 of FIG. 16B contains five symmetrically placed channels 1604A, 1604B, 1604C, 1604D, 1604E of 120 μm diameter each. FIG. 17 is a plot illustrating a simulated meniscus displacement as a function of time for the ejection of a droplet from the multichannel nozzle embodiments of FIGS. 16A and 16B as compared to a standard unconstricted nozzle design embodiment. FIG. 17 illustrates the meniscus motion in a single droplet event for the four-channel multichannel nozzle design of FIG. 16A and the five-channel multichannel nozzle design of FIG. 16B as compared to a standard nozzle design. The meniscus motion results over time suggest that both the four channel and five channel nozzle designs having multichannel dissipative sections both dissipate energy considerably faster than the standard design, with upper estimates 0.0098 s for the standard design, 0.005 s for the 4-channel and 0.003 s for the five-channel nozzle.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A drop-on-demand (DOD) printer, comprising:

an ejector comprising a nozzle, the nozzle comprising:

a tank in communication with a source of printing material;

a constricted dissipative section in communication with the tank, comprising an elongated internal channel having a diameter of constriction, de that is approximately constant along a length of the constricted dissipative section, a cross-sectional area, A, a characteristic length of a fluid boundary layer inside the constricted dissipative section, δ, and a perimeter of the constricted dissipative section, S, and wherein a length of the constricted dissipative section is 400 μm, and a porous media contained within the constricted dissipative section comprising a ceramic or a metal-based foam; and a shaping section comprising a shaping tip in communication with the constricted dissipative section comprising an exit orifice, the shaping section having a non-continuous diameter and comprising a length of 100 μm; and a power source configured to supply one or more pulses of power to the ejector, which causes one or more drops of the printing material to be jetted out of the nozzle; and wherein:

a cross-sectional area of the constricted dissipative section is less than a cross-sectional area of the exit orifice;

the constricted dissipative section is configured to operate at a relaxation time, τ, of the nozzle which is proportional to Aδ/δ, independent of the length of the constricted dissipative section and proportional to $d_c^2$; and the relaxation time, τ, is from about 0.0039 seconds to about 0.0083 seconds and the diameter of constriction is from about 0.2 mm to about 0.4 mm.

2. The DOD printer of claim 1, wherein the constricted dissipative section of the nozzle is configured to obstruct fluid flow.

3. The DOD printer of claim 1, wherein the elongated internal channel is cylindrical.

4. The DOD printer of claim 1, wherein the constricted dissipative section of the nozzle is axisymmetric and has a diameter less than a diameter of the tank.

5. The DOD printer of claim 1, wherein the constricted dissipative section of the nozzle is axisymmetric and has a diameter less than a diameter of the shaping tip.

6. The DOD printer of claim 1, wherein the constricted dissipative section of the nozzle comprises at least three internal cylindrical channels.

7. The DOD printer of claim 6, wherein the at least three internal cylindrical channels have substantially the same diameter.

8. The DOD printer of claim 1, wherein the constricted dissipative section comprises at least two intersecting channels that are substantially perpendicular to one another.

9. The DOD printer of claim 1, wherein the nozzle further comprises a tapered transition between the constricted dissipative section and the shaping tip.

10. The DOD printer of claim 1, wherein the exit orifice of the shaping tip of the nozzle is cylindrical.

11. The DOD printer of claim 10, wherein a radius of curvature of exit orifice is less than 10 percent of a diameter of the exit orifice.

12. The DOD printer of claim 1, wherein the nozzle is configured to eject a droplet by operating a droplet generation event followed by a droplet ejection event.

13. The DOD printer of claim 1, wherein the printing material comprises a polymer, polymer composite, or a combination thereof.

14. The DOD printer of claim 1, wherein the printing material comprises metal, metallic alloys, or a combination thereof.

15. The DOD printer of claim 14, wherein the printing material comprises aluminum, aluminum alloys, or a combination thereof.

16. A drop-on-demand (DOD) printer, comprising:

an ejector comprising a nozzle, the nozzle comprising:

a tank in communication with a source of printing material;

a constricted dissipative section in communication with the tank and configured to obstruct fluid flow, comprising an elongated internal channel having a diameter of constriction, $d_c$ that is approximately constant along a length of the constricted dissipative section, a cross-sectional area, A, a characteristic length of a fluid boundary layer inside the constricted dissipative section, δ, and a perimeter of the constricted dissipative section, S, and wherein a length of the constricted dissipative section is 400 μm, and a porous media contained within the constricted dissipative section comprising a ceramic or a metal-based foam; and a shaping section comprising a shaping tip in communication with the constricted dissipative section comprising an exit orifice, the shaping section having a non-continuous diameter and comprising a length of 100 μm; and a power source configured to supply one or more pulses of power to the ejector, which causes one or more drops of the printing material to be jetted out of the nozzle; and wherein the nozzle is configured to eject a droplet by operating a generation event followed by an ejection event; and wherein:

a cross-sectional area of the constricted dissipative section is less than a cross-sectional area of the exit orifice;

the constricted dissipative section is configured to operate at a relaxation time, τ, of the nozzle which is proportional to Aδ/δ, independent of the length of the constricted dissipative section and proportional to $d_c^2$; and the relaxation time, τ, is from about 0.0039 seconds to about 0.0083 seconds and the diameter of constriction is from about 0.2 mm to about 0.4 mm.

17. The drop-on-demand (DOD) printer of claim 16, wherein the dissipative section comprises:

an axisymmetric portion;

a diameter less than a diameter of the tank; and a diameter less than a diameter of the shaping tip.

18. The drop-on-demand (DOD) printer of claim 16, wherein the dissipative section of the nozzle comprises at least three internal cylindrical channels and having substantially the same diameter.

19. A drop-on-demand (DOD) printer, comprising:

an ejector comprising an array of nozzles, the array of nozzles comprising:

a plurality of nozzles, each nozzle comprising:

a tank in communication with a source of printing material;

a constricted dissipative section in communication with the tank and configured to obstruct fluid flow, comprising an elongated internal channel having a diameter of constriction, de that is approximately constant along a length of the constricted dissipative section, a cross-sectional area, A, a characteristic length of a fluid boundary layer inside the constricted dissipative section, δ, and a perimeter of the constricted dissipative section, S, and wherein a length of the constricted dissipative section is 400 μm, and a porous media contained within the constricted dissipative section comprising a ceramic or a metal-based foam; and a shaping section comprising a shaping tip in communication with the constricted dissipative section comprising an exit orifice, the shaping section having a non-continuous diameter and comprising a length of 100 μm; and a power source configured to supply one or more pulses of power to the ejector, which causes one or more drops of the printing material to be jetted out of the nozzle; and wherein the nozzle is configured to eject a droplet by operating a generation event followed by an ejection event; and wherein:

a cross-sectional area of the constricted dissipative section is less than a cross-sectional area of the exit orifice;

the constricted dissipative section is configured to operate at a relaxation time, τ, of the nozzle which is proportional to Aδ/δ, independent of the length of the constricted dissipative section and proportional to $d_c^2$; and the relaxation time, τ, is from about 0.0039 seconds to about 0.0083 seconds and the diameter of constriction is from about 0.2 mm to about 0.4 mm.

20. The DOD printer of claim 19, wherein the printing material comprises metal, metallic alloys, or a combination thereof.

* * * * *